United States Patent [19]

Oishi et al.

[11] Patent Number: 6,148,035

[45] Date of Patent: Nov. 14, 2000

[54] PROCESSING OF REDUNDANT FIELDS IN A MOVING PICTURE TO ACHIEVE SYNCHRONIZED SYSTEM OPERATION

[75] Inventors: Noriaki Oishi; Motoki Kato; Toshihiko Kitazawa; Kazunori Yasuda, all of Kanagawa, Japan

[73] Assignee: Sony Corporation, Tokyo, Japan

[21] Appl. No.: 09/451,048

[22] Filed: Nov. 30, 1999

Related U.S. Application Data

[62] Division of application No. 08/854,250, May 9, 1997, which is a continuation of application No. 08/578,317, Dec. 26, 1995, Pat. No. 5,691,771.

[30] Foreign Application Priority Data

Dec. 29, 1994 [JP] Japan ................................ 6-340583

[51] Int. Cl.⁷ ............................. H04N 3/36; H04N 5/253
[52] U.S. Cl. ................ 375/240.26; 348/97; 375/240.12; 375/240.15
[58] Field of Search ..................... 375/240.26, 240.12, 375/240.15; 348/97, 384, 390, 700, 701, 409, 411, 412; 386/46; H04N 3/36, 5/253

[56] References Cited

U.S. PATENT DOCUMENTS

| | | | |
|---|---|---|---|
| 5,155,594 | 10/1992 | Bernstein et al. | 348/411 |
| 5,317,398 | 5/1994 | Casavant et al. | 348/570 |
| 5,319,453 | 6/1994 | Copriviza et al. | 348/6 |
| 5,426,464 | 6/1995 | Casavant et al. | 348/415 |
| 5,491,516 | 2/1996 | Casavant et al. | 348/415 |
| 5,532,746 | 7/1996 | Chang | 348/415 |
| 5,541,658 | 7/1996 | Ishiwata | 348/394 |
| 5,561,477 | 10/1996 | Polit | 348/700 |
| 5,565,998 | 10/1996 | Coombs et al. | 386/46 |

*Primary Examiner*—Howard Britton
*Attorney, Agent, or Firm*—Frommer Lawrence & Haug, LLP.; William S. Frommer

[57] ABSTRACT

A method for processing a moving picture in which input digital moving picture signals of a pre-set picture rate are processed in accordance with pre-set picture processing and the processed digital picture signal are transmitted. The input digital moving picture signal has plural field pictures. The processing method includes a first step of detecting a redundant field from the input digital moving picture signals, a second step of eliminating the detected redundant field from the plural field pictures, a third step of deciding, from a string of field pictures from which the redundant fields have been eliminated, the combination of a top field and a bottom field constituting a frame to be processed in accordance with the pre-set picture processing, and outputting the results of decision, a fourth step of inserting a pre-set signal in the field picture string from which the redundant field has been eliminated for generating picture signals for processing having the same picture rate as the rate of the input digital picture signal, and a fifth step of processing the picture signals for processing in accordance with the pre-set picture processing based upon the results of decision.

4 Claims, 18 Drawing Sheets

FIG.8

| | | | | | | | | | | | | | | | | | | | | | | |
|---|---|---|---|---|---|---|---|---|---|---|---|---|---|---|---|---|---|---|---|---|---|---|
| S100 | INPUT PICTURE SIGNAL | ←1FRAME→ A\|a | B\|b | B\|a | C\|c | D\|d | A\|d | B\|a | B\|b | C\|c | D\|d | A\|d | B\|a | B\|b | C\|c | D\|d | A\|d | | | | |
| (S212) | REDUNDANT FIELD DETECTION FLAG | x\|x | x\|* | x\|x | x\|x | x\|* | x\|x | x\|x | x\|* | x\|x | x\|x | x\|* | x\|x | x\|x | x\|* | x\|x | x\|x | | | | | |
| S200 | 2-FIELD DELAY | | A\|a | B\|b | B\|c | C\|d | D\|d | A\|a | B\|b | B\|c | C\|d | D\|d | A\|a | B\|b | B\|c | C\|d | D\|d | A | | | | |
| S208 | 4-FIELD DELAY | | | A\|a | B\|b | B\|c | C\|d | D\|d | A\|a | B\|b | B\|c | C\|d | D\|d | A\|a | B\|b | B\|c | C\|d | D\|d | A\|d | | | |
| | top_field-first FLAG repeat_first_field FLAG | | | 1 0 | 1 1 | 0 1 | 1 0 | 0 0 | 1 1 | 0 1 | 1 0 | 0 0 | 1 1 | 0 1 | 1 0 | 0 0 | 1 1 | 0 1 | | | | |
| S210 | INVERSE 3:2 PULL-DOWN OUTPUT | | | A\|a | B\|b | C\|c | X\|D | D\|d | A\|a | B\|b | C\|c | X\|D | D\|d | A\|a | B\|b | C\|c | X\|D | D\|d | | | | |
| | QUANTITY OF FIELD DELAY | | | 4 | 4\|4 | 4\|4 | 4\|2 | 4\|x | x\|4 | 4\|4 | 4\|4 | 4\|2 | 4\|x | x\|4 | 4\|4 | 4\|4 | 4\|2 | 4\|x | x\|4 | | | |

FIG.10

| | | | | | | | | | | | | | |
|---|---|---|---|---|---|---|---|---|---|---|---|---|---|
| S104 | | F02 | F02 | F03 | F04 | x01 | F05 | F06 | F07 | F08 | x02 | F09 | F10 | F11 | F12 | x03 | F13 |
| S501 | | I01 | B02 | P03 | B04 | x01 | P05 | B06 | P07 | B08 | x02 | P09 | B10 | P11 | B12 | x03 | P13 |
| S502 | | | I01 | P03 | B02 | P05 | B04 | x01 | P07 | B06 | P09 | B08 | x02 | P11 | B10 | P13 | B12 | x03 |

I**: I - PICTURE
P**: P - PICTURE
B**: B - PICTURE
x**: INVALID FRAME

FIG.14

FIG. 17A FRAME DCT MODE

FIG. 17B FIELD DCT NMODE

—— top_field DATA
---- bottom_field DATA

| S505 | I01 | P03 | B02 | P05 | B04 | x01 | P07 | B06 | P09 | B08 | x02 | P11 | B10 | P13 | B12 | x03 |     |
|------|-----|-----|-----|-----|-----|-----|-----|-----|-----|-----|-----|-----|-----|-----|-----|-----|-----|
| S109 | I01 |     | B02 | P03 | B04 | x01 | P05 | B06 | P07 | B08 | x02 | P09 | B10 | P11 | B12 | x03 | P13 |

I\*\*: I - PICTURE
P\*\*: P - PICTURE
B\*\*: B - PICTURE
x\*\*: INVALID FRAME

FIG.18

PROCESSING OF REDUNDANT FIELDS IN A MOVING PICTURE TO ACHIEVE SYNCHRONIZED SYSTEM OPERATION

This application is a division of application Ser. No. 08/854,250, filed May 9, 1997, which is a continuation of application Ser. No. 08/578,317, filed Dec. 26, 1995, now U.S. Pat. No. 5,691,771.

BACKGROUND OF THE INVENTION

This invention relates to a moving picture processing device for processing a moving picture containing a redundant picture. More particularly, it relates to a moving picture processing device for processing moving picture signals obtained as a result of photoelectric conversion of a source of original pictures, such as a motion picture film.

For interconnecting plural devices handling moving pictures in a moving picture processing system, it is necessary to synchronize the moving pictures. In general, one of the devices of the system is used as a reference and the remaining devices are caused to follow the reference device. This reference device is termed a master and the remaining devices are termed slave devices. The master device is exemplified by a video camera, a VTR, a video disc or a computer, as a supply source for moving pictures, while the slave device is exemplified by an encoder, a VTR or a monitor designed to process the moving pictures.

The synchronization signal from the master device is supplied as a reference clock for a phase locked loop (PLL) of the system.

An illustrative moving picture encoding system is shown in FIG. 1.

This moving picture encoding system has many clock signals, such as clock signals for an encoder 101, clock signals for a local decoder 102, or display clock signals. Of these, a picture synchronization input S2, supplied from a digital VTR 100 of a picture input device 10, as a supply source for the moving pictures, represent master clock signals.

The encoding of the moving pictures is a technique recognized to be indispensable for reducing transmission costs at the time of digital transmission of moving pictures.

For example, a picture processor 20 is made up of the encoder 101 and the local decoder 102, and implements a hybrid encoding method consisting in the combination of motion compensation prediction and DCT well-known as MPEG 2 (ISO/IEC 13813-2).

An input picture S1 is given at a rate of 30 frames/second (60 fields/second) or 25 frames/second (50 fields/second).

In FIG. 2, the fields shown by intersected hatching denote top fields or odd fields, while the fields shown by hatching denote bottom fields or even fields. In the present example, each frame is necessarily constituted by a pair of fields. Thus a frame synchronization signal S2 is supplied in synchronism with each frame. In this case, all input pictures are encoded by the picture processor 20 of FIG. 1, with the encoder 101 being locked in operation by the frame synchronization signal S2.

If the input picture S1 is free of redundant fields, the moving picture encoding system operates flawlessly by employing the frame synchronization signal S2.

However, on certain occasions redundant pictures are contained in the input picture S1.

Such redundant picture is contained in the moving picture obtained on recording e.g. a motion picture film in a VTR by photo-electric conversion. That is, the number of picture frames of the motion picture film as an original picture source is 24 per second, whereas that of the NTSC television system is 30 frames (60 fields) per second. To compensate for the six frames (12 fields) per second which fall short, the same fields are repeated at a rate of one field per two picture frames for converting the two picture frames into five fields thereby converting the 24 picture frames into 60 fields, that is 30 frames. This method is termed 3:2 pull-down, as will be explained subsequently in detail. The repeated fields are the same as the previous fields and represent redundant pictures.

With the quantity of moving picture encoding system, the data is diminished by detecting and not encoding the redundant pictures. Thus, although not shown in the example of FIG. 1, the encoder 101 detects the redundant pictures in the pre-processing process and simply omits encoding the redundant pictures.

This processing operation is shown specifically in FIG. 3.

In the present example, the redundant pictures are shown by plain textured fields and are not encoded.

If the plain-textured field is the odd field, it is the same as the immediately previous odd field, whereas, if the plain-textured field is the even field, it is the same as the directly previous even field. Thus, one field is eliminated every five fields and a new input frame is produced by two consecutive fields next to the eliminated field.

The timing of the frame entering the next-stage picture processor is asynchronous with respect to the frame synchronization signal S2, as may be seen by a timing pulse S3, such that there is no possibility of locking operations with respect to the frame synchronization signal S2. The result is that, with the moving picture processing system of FIG. 1 employing the frame synchronization signal S2 in the picture processing system, the frame synchronization signal S2 cannot be used in e.g., the picture processor 20.

On the other hand, in case of processing not only the usual moving pictures shown in FIG. 2 but also the moving pictures including redundant pictures shown in FIG. 3. the processing by the picture processor 20 is increased in complexity depending on whether or not the pre-processing is to be performed.

In addition, with a series of moving pictures containing redundant pictures in an irregular manner, the frame timing may be changed irregularly in a more complex fashion. There is no up to now a picture processing device capable of coping with all of these variable timings, and it is difficult to produce such picture processing device.

OBJECTS AND SUMMARY OF THE INVENTION

It is therefore an object of the present invention to provide a method and apparatus for processing moving pictures capable of processing moving pictures containing redundant pictures at a pre-set period or in an irregular fashion.

It is another object of the present invention to provide a technique in a picture processing system employing a picture synchronization input from the picture input device as master clock signals, according to which, even in such case wherein a string of pictures entering the next-stage picture processor is not locked with respect to the synchronization input of the original input moving picture due to pre-processing operations of eliminating redundant pictures from the original input picture, processed pictures can be outputted by picture processing operations employing the synchronization input of the original input picture as master clock signals of the picture processing system.

Thus, it is yet another object of the present invention to provide a technique whereby a synchronization signal for an input frame or field may also be employed in an encoder.

In one aspect, the present invention provides a method for processing a moving picture in which input digital moving picture signals of a pre-set picture rate are processed in accordance with pre-set picture processing and for transmitting the processed digital picture signals. The input digital moving picture signal has plural field pictures. The method includes a first step of detecting a redundant field from the input digital moving picture signals, a second step of eliminating the detected redundant field from the plural field pictures, a third step of deciding, from a string of field pictures from which the redundant fields have been eliminated, the combination of a top field and a bottom field constituting a frame to be processed in accordance with the pre-set picture processing, and outputting the results of decision, a fourth step of inserting a pre-set signal in the field picture string from which the redundant field has been eliminated for generating picture signals having the same picture rate as the rate of the input digital picture signal, and a fifth step of processing the picture signals in accordance with the pre-set picture processing based upon the results of the decision. In this manner, the moving pictures containing the redundant pictures at a constant period or at irregular intervals may be converted to new picture string signals synchronized with the input picture synchronization signals.

Preferably, the method also includes a sixth step of appending to the picture signals the subsidiary information employed for processing the picture signals by the pre-set picture processing operation.

Preferably, the input digital moving picture signal is a signal generated by 3:2 pull-down according to which each picture of an original image is read out in two or three fields for changing the picture rate. By appending the subsidiary information to the picture signals, correct picture processing may be carried out by the picture encoder based upon the subsidiary information.

If the input digital moving picture signal is a signal generated by 3:2 pull-down according to which each picture of an original image is read out in two or three fields for changing the picture rate, the subsidiary information includes a first flag specifying which of the top field and the bottom field has been read out first when processing the original image, a second flag specifying whether each picture of the original image has been read out with three fields or with two fields, and a third flag specifying which picture signals of the picture signals are the inserted pre-set signals. In this manner, picture processing may be carried out correctly.

In the sixth step, pre-set picture processing is preferably compression encoding which is not executed for picture signals to which the third flag is appended.

In the first step, the redundant field is detected by calculating the inter-field correlation of the input digital moving picture signal.

Preferably, the pre-set signals inserted in the picture signal are invalid signals nonsensical as picture signals. Since these invalid signals need not be encoded for compression by the encoder, picture processing may be carried out efficiently.

If the input digital moving picture signal is a signal generated by 3:2 pull-down according to which each picture of an original image is read out in two or three fields for changing the picture rate, a redundant field is detected by calculating the inter-field correlation between picture signals of the current field of the input digital moving picture signals and picture signals delayed therefrom by two fields. The number of the input fields of the input digital moving picture signals is counted. It is then judged whether the count value is a pre-set value, and the redundant field is detected from the results of the decision and the inter-field correlation, so that the redundant field may be detected reliably.

If the input digital moving picture signal is a signal generated by 3:2 pull-down according to which each picture of an original image is read out in two or three fields for changing the picture rate, the subsidiary information includes a first flag specifying which of the top field and the bottom field has been read out first when processing the original image, a second flag specifying whether each picture of the original image has been read out with three fields or with two fields, and a third flag specifying which picture signals of the picture signals for processing are the inserted pre-set signals.

In another aspect, the present invention provides a method for processing moving picture signals in which digital moving picture signals of a pre-set picture rate containing redundant fields are restored from picture signals generated by removing the redundant fields from the digital moving picture signals made up of a plurality of field pictures, inserting preset invalid signals corresponding to the redundant fields into the digital moving picture signals from which the redundant fields have been removed and by appending the subsidiary information for controlling the picture processing. The method includes a first step of removing the subsidiary information from the picture signals, a second step of removing the invalid signals from the picture signals for processing using the subsidiary information, and a third step of repeating picture signals of a portion of a picture signal string from which the invalid signals have been removed for generating the redundant fields for restoring the digital picture signals of the pre-set picture rate. In this manner, digital moving picture signals for display may be produced easily.

Thus, in a moving picture processing system employing a picture synchronization input supplied from a picture inputting device as master clock signal, if a picture string for processing B to be inputted to a picture processing device A of the next stage cannot be locked to the picture synchronizing input supplied from the picture inputting device due to pre-processing of removing redundant pictures from the original input moving pictures, the picture string B can be re-formed into a new picture string C that can be locked to the picture synchronization input. In this manner, the picture synchronizing input supplied from the picture inputting device can be used at all times as master clock signals for the picture processing device. On the other hand, since the picture processing device, which represents a core portion of the picture processing system, need not be specifically modified from that used in the usual case, that is the case in which the usual input picture string is locked to the picture synchronization input, the picture processing device is not unduly complicated in terms of structure.

With the moving picture signal processing method according to the present invention, the redundant fields are detected and eliminated from the input digital picture signals to form a picture string; the combination of the top field and the bottom field, making up the frame for processing by compression encoding, is discriminated from the picture string to form a frame picture string and pre-set signals are inserted into the frame picture string for producing picture signals for processing. In this manner, new picture string signals synchronized with the picture synchronization signals may be formed from moving pictures containing redundant pictures at a constant period or at irregular intervals.

The subsidiary information for picture processing may be appended to the picture string for enabling correct processing to be performed by the picture encoder based upon the subsidiary information.

If the input digital moving picture signals are the signals read out by the 3:2 pull-down method in which a picture of an original image, such as a picture frame of a motion picture film, is read in two or three fields, the subsidiary information contains a first flag specifying whether it is the top field or the bottom field that has been read out first when reading out the original image, that is a top_field_first flag, a second flag specifying whether a picture of the original image has been read out in three fields or in two fields, that is a repeat_first flag, and a third flag specifying which picture signals are the invalid signals as the preset signals.

In such case, since the compression encoding can be omitted for these invalid signals, more efficient picture encoding can be achieved.

If the input digital moving picture signals are signals read out by the 3:2 pull-down method according to which a picture of the original image, for example, a picture frame of a motion picture film, is read out in two or three fields, the redundant field detection means preferably includes a field counter which is adapted for calculating the inter-field correlation between the current field of the input digital moving picture signals and the field delayed therefrom by two pictures, and which is reset to zero on detection of redundant fields, and comparator means for judging whether the count value from the field counter is an odd number of not less than 5. Redundant fields may be reliably detected by detecting the redundant field based upon the output of the comparator means and the inter-field correlation.

BRIEF DESCRIPTION OF THE DRAWINGS

FIG. 8 is a timing chart for showing an illustrative operation of the pre-processor.

FIG. 10 is a flowchart for showing an illustrative operation of the post-processor.

FIG. 14 illustrates an operation of picture encoding type designation, picture encoding sequence and picture rearranging operation.

FIG. 18 illustrates a picture display sequence rearranging operation.

DESCRIPTION OF THE PREFERRED EMBODIMENTS

Figure 1:
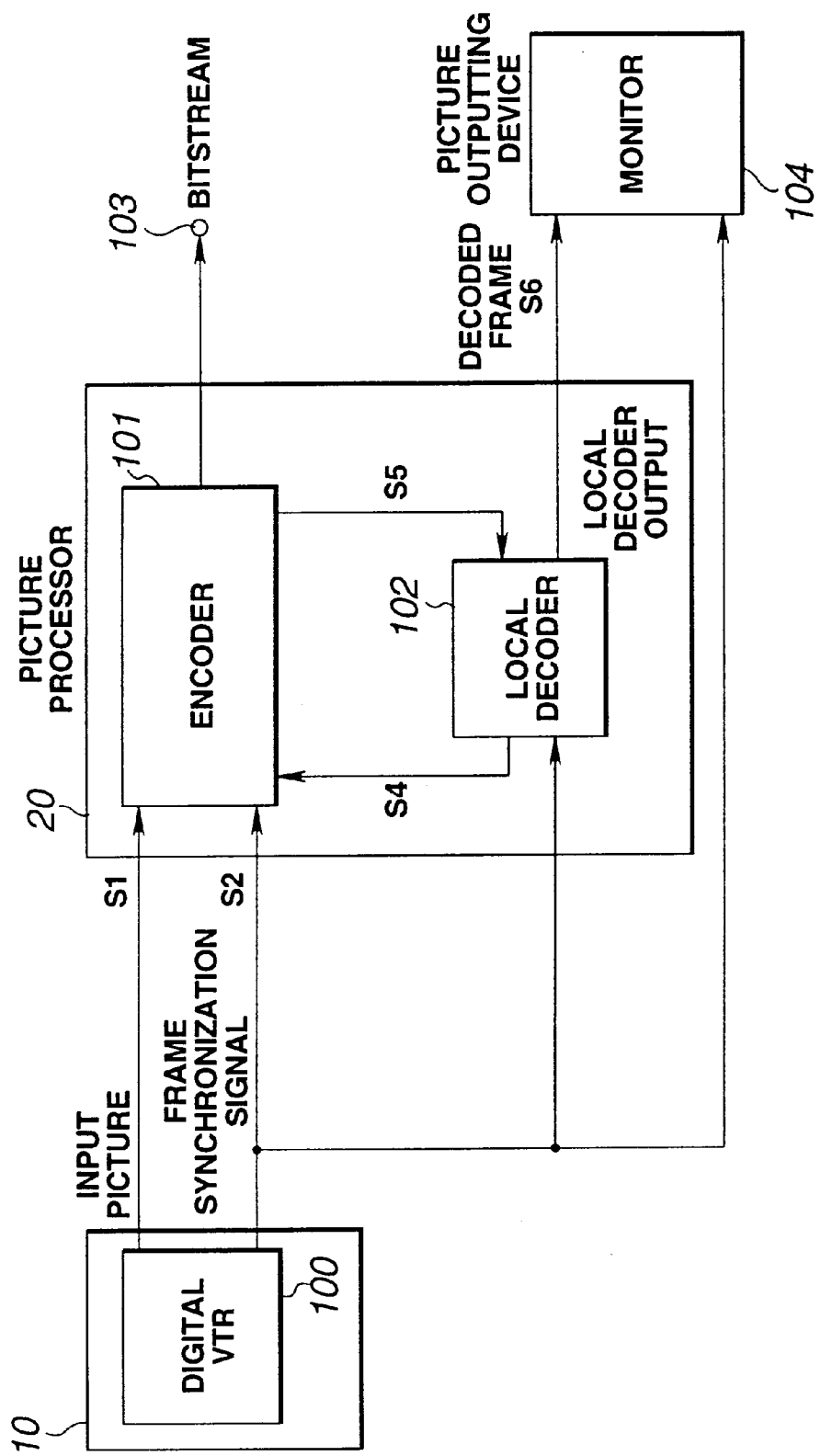
FIG. 1 is a block diagram showing an illustrative conventional moving picture processing system.
Figure 2:
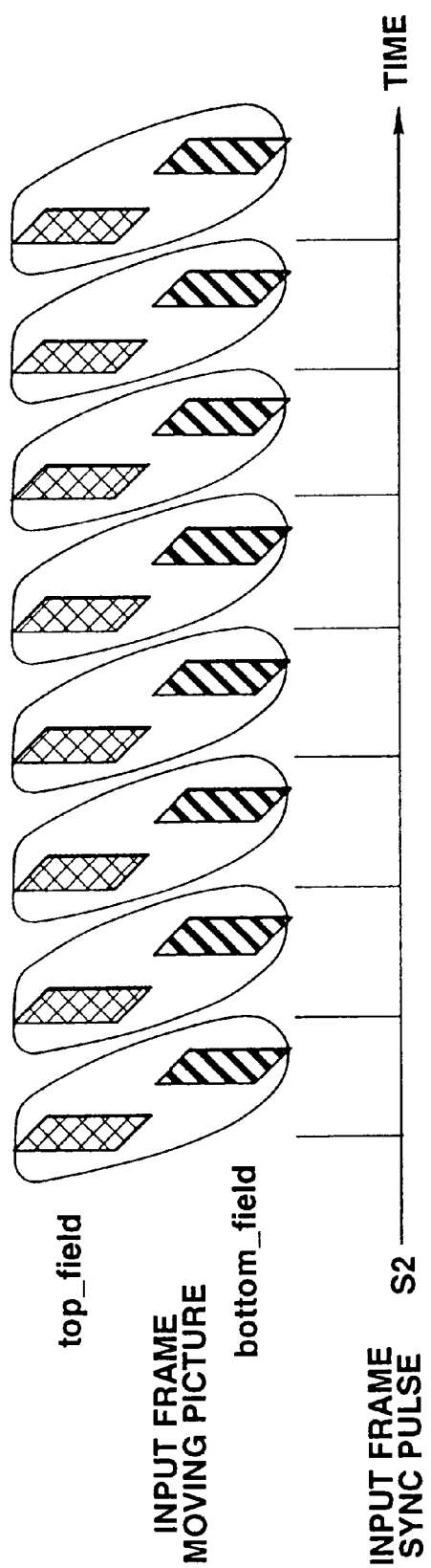
FIG. 2 illustrates frame synchronization.
Figure 3:
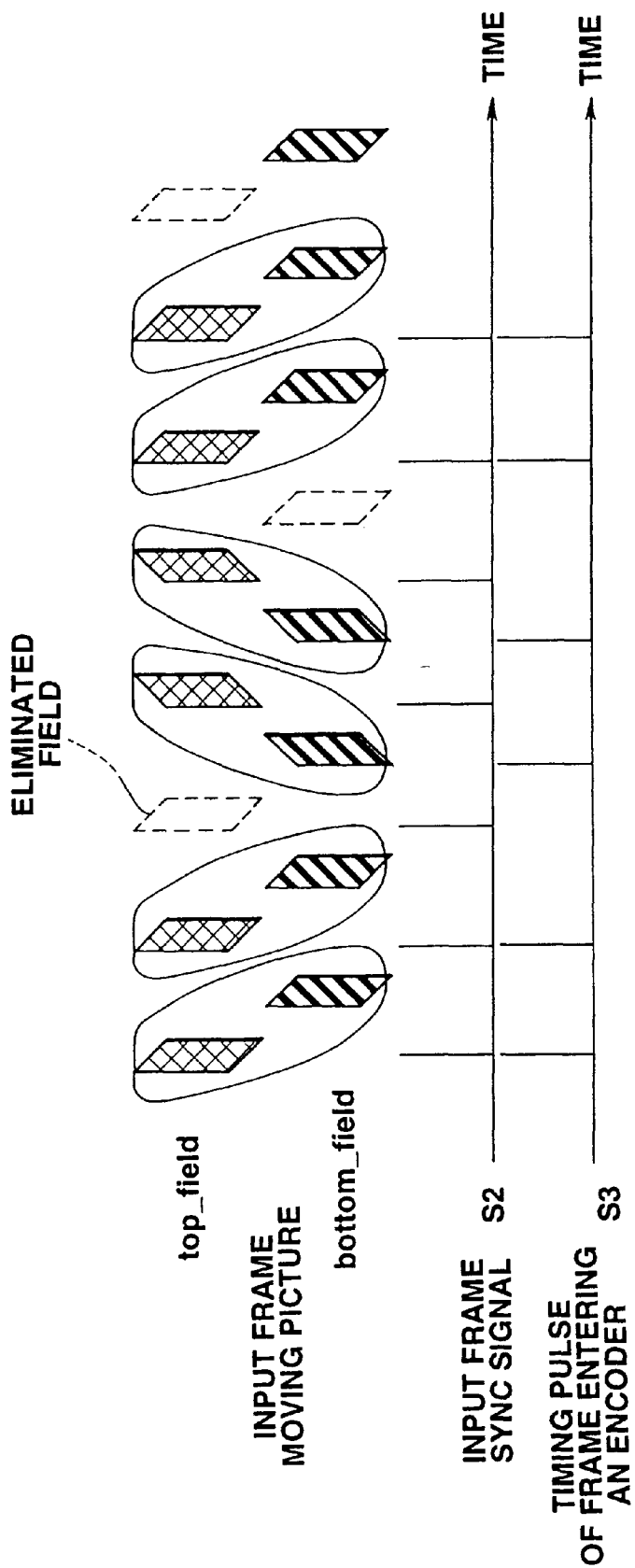
FIG. 3 illustrates the operation of eliminating redundant fields from the 3:2 pull-down signals.
Figure 4:
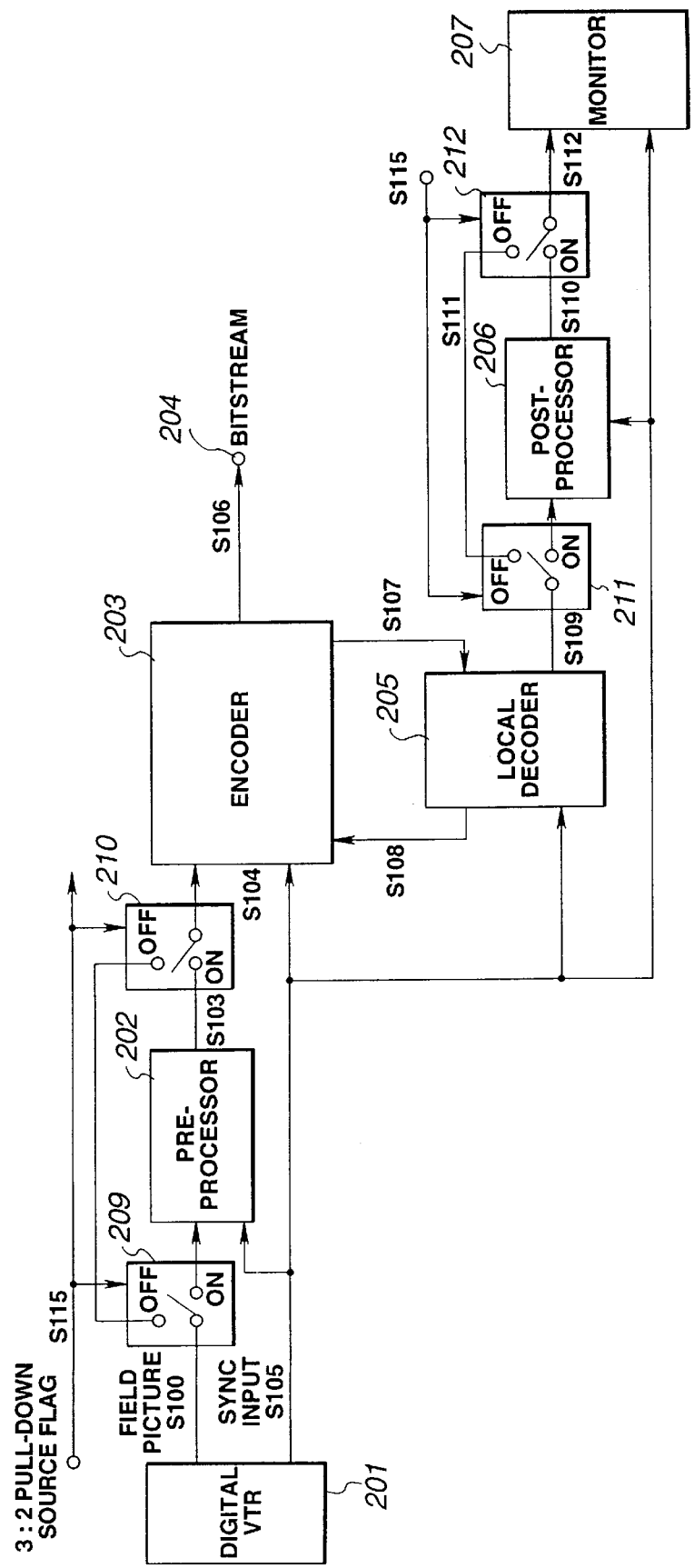
FIG. 4 is a block diagram showing a moving picture processing system according to an embodiment of the moving picture processing method according to the present invention.

Referring to FIG. 4, a moving picture processing device for carrying out the moving picture processing method of the present invention will be explained in detail.

FIG. 4 shows an example of a moving picture processing system, inclusive of a moving picture processing device, in which an original input moving picture signal is a video signal of a film source the frame rate of which has been set to 30 Hz by so-called 3:2 pull-down.

The 3-2 pull-down is briefly explained. When the film source, such as a motion picture, is converted into interlaced video signals, the technique known as the 3:2 pull-down is widely employed. That is, if the number of picture frames of a motion picture film is 24 per second, and the interlaced video signal has a picture rate of 30 frames per second or 60 fields per second, the number of fields is converted by the 3:2 pull-down.

That is, such a technique is employed in which, of two consecutive picture frames of a film, that is MF1 and MF2, the first picture frame MF1 is read out with two video fields, while the second picture frame MF2 is read out with three fields.

On the other hand, the inverse 3:2 pull-down is such an operation in which a picture frame read out with three fields is detected from 30 frame/second interlaced video signals, and any redundant field is removed for producing progressive frames having a frame rate of 24 frames per second. Ideally, the redundant fields appear at a period of five fields.

In a moving picture processing system, shown in FIG. 4, an interlaced signal having a rate of 30 frames per second or 60 fields per second, as an input moving picture signal S100, is supplied, with a top field top_field first, from a digital VTR 201, as a picture inputting device.

If the input moving picture signal S100 is a moving picture converted from the film source by the 3:2 pull-down, a flag S115 is set, while switches 209, 210, 211 and 212 are set to the on-side. If the input moving picture S100 is not the moving picture converted by the 3:2 pull-down, these switches are set to the off-side. With the switches set to the off-side, the system configuration is basically the same as the conventional system. In the following description, it is assumed that the above switches have been set to the on-sides, that is that the input moving pictures contain redundant pictures.

If the switch 209 is connected to the on-side, the input moving picture signal S100 is processed by a pre-processor 202 and thereby converted into a moving picture signal S103.

Figure 6:
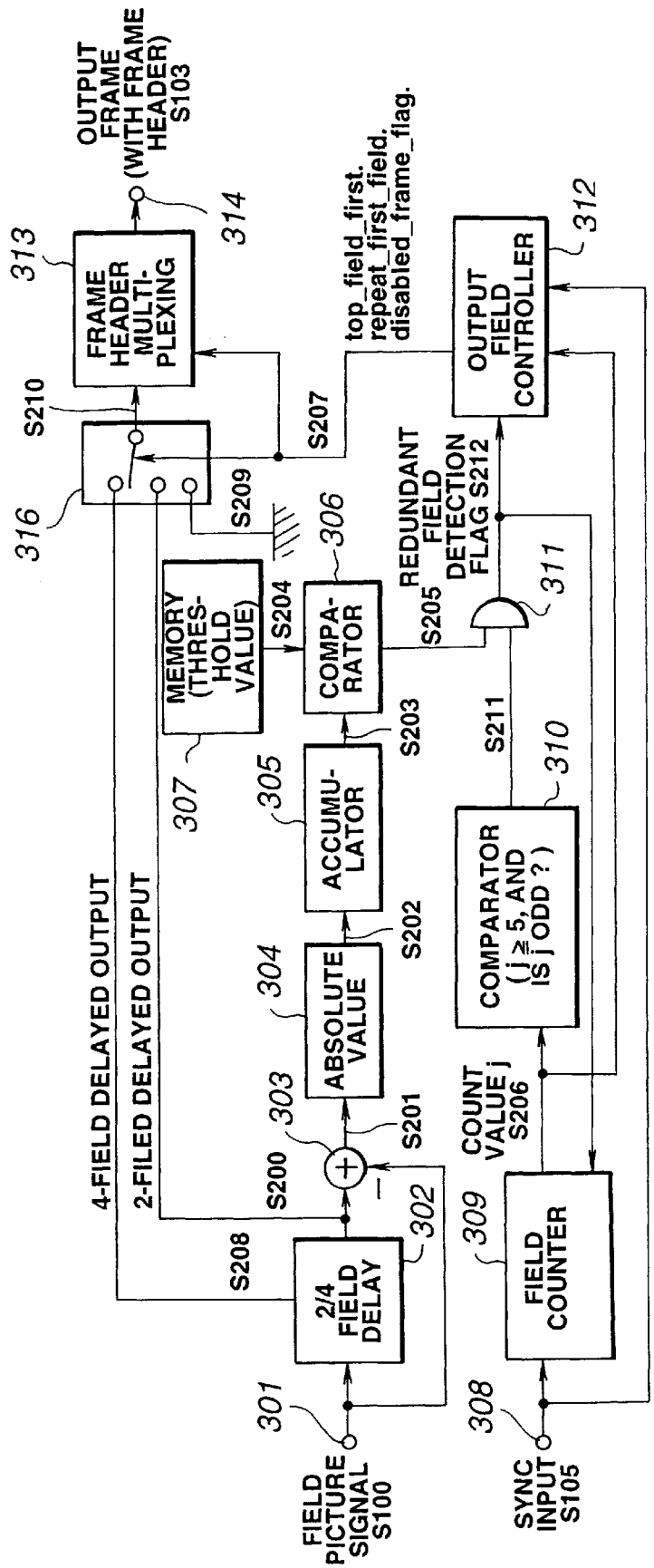
FIG. 6 is a block circuit diagram showing an illustrative construction of a pre-processor.

The processing by the pre-processor 202 is explained further by referring to FIG. 6.

The two-field signal correlation between the moving picture signal S100 of the 60 Hz video field, entering a terminal 301, and a field signal S200 outputted with a 2-field delay from a delay unit 302, is calculated. For this calculation, a difference value is calculated by a unit 303 from on a pixel by-pixel basis. An absolute value unit 304 finds absolute values of the difference values S201, calculated from pixel to pixel, and a sum S203 of the absolute values per field is calculated in an adder 305. The sum S203 is compared by a comparator 306 to a pre-set threshold S204. If the sum is smaller than the threshold value S204, a flag S205 is set. It is noted that any other means for calculating the correlation between the two fields S100 and S200 may be employed in addition to the above method.

On the other hand, the synchronization input S105 of the field picture signal S100 enters a field counter 309 from a terminal 308. That is, the counter 309 counts up the number of the fields entering the pre-processor 202. If the number of the count value j represented by S206 is an odd number not less than 5, a comparator 310 sets a flag S211. When both the flag S211 and the flag S205 have been set, an output S212 of an AND gate 311 is high, thus indicating that the current input field signal S100 is a redundant field which has been repeated by the 3:2 pull-down. If the flag S212 is set, the counter 309 is cleared to zero. The field found to be a redundant field is removed from the input picture without being encoded.

The reason in the comparator 310 for the count value j being an odd number not less than 5 is that, due to the following reasons, the inverse 3:2 pull-down is not guaranteed to operate normally at al times.

First, the pattern of the redundant field appearing at a 5-field period is not guaranteed due to video editing following 3:2 pull-down.

Second, since a smoothing filter is applied during 3:2 pull-down along the time axis, that is between different fields and between different frames, redundant fields become difficult to detect depending upon picture patterns. For example, there are occasions wherein the flag S205 is not set at the comparator 306 even though the current input field is a redundant field.

Even if the 3:2 pull-down pattern is not guaranteed, it becomes possible for the comparator 310 to continue to give decision as to the redundant field.

Since in effect the 3:2 pull-down is not necessarily carried out regularly, the frame rate for moving pictures after removing the resultant fields from the input moving picture S100 is fluctuated in a range between 24 Hz and 30 Hz. This period is not locked to the synchronization input S105. Thus, in the present embodiment, the input fields are rearranged in their sequence, and invalid frames are inserted, by way of preprocessing, for creating a new input picture string that can be locked to the synchronization input. It is this new input picture string that is caused to enter the next stage unit, that is an encoder 203.

The method of rearranging the fields and inserting the invalid frames is explained by referring to FIG. 6. An output field controller 312 causes a switch 316 to switch between three signals, namely the field signal S200, outputted with a delay of two fields (one frame) from the delay unit 302, a field signal delayed by four fields S208 and an invalid field signal S209, based upon the redundant field detection flag S212.

Figure 5:
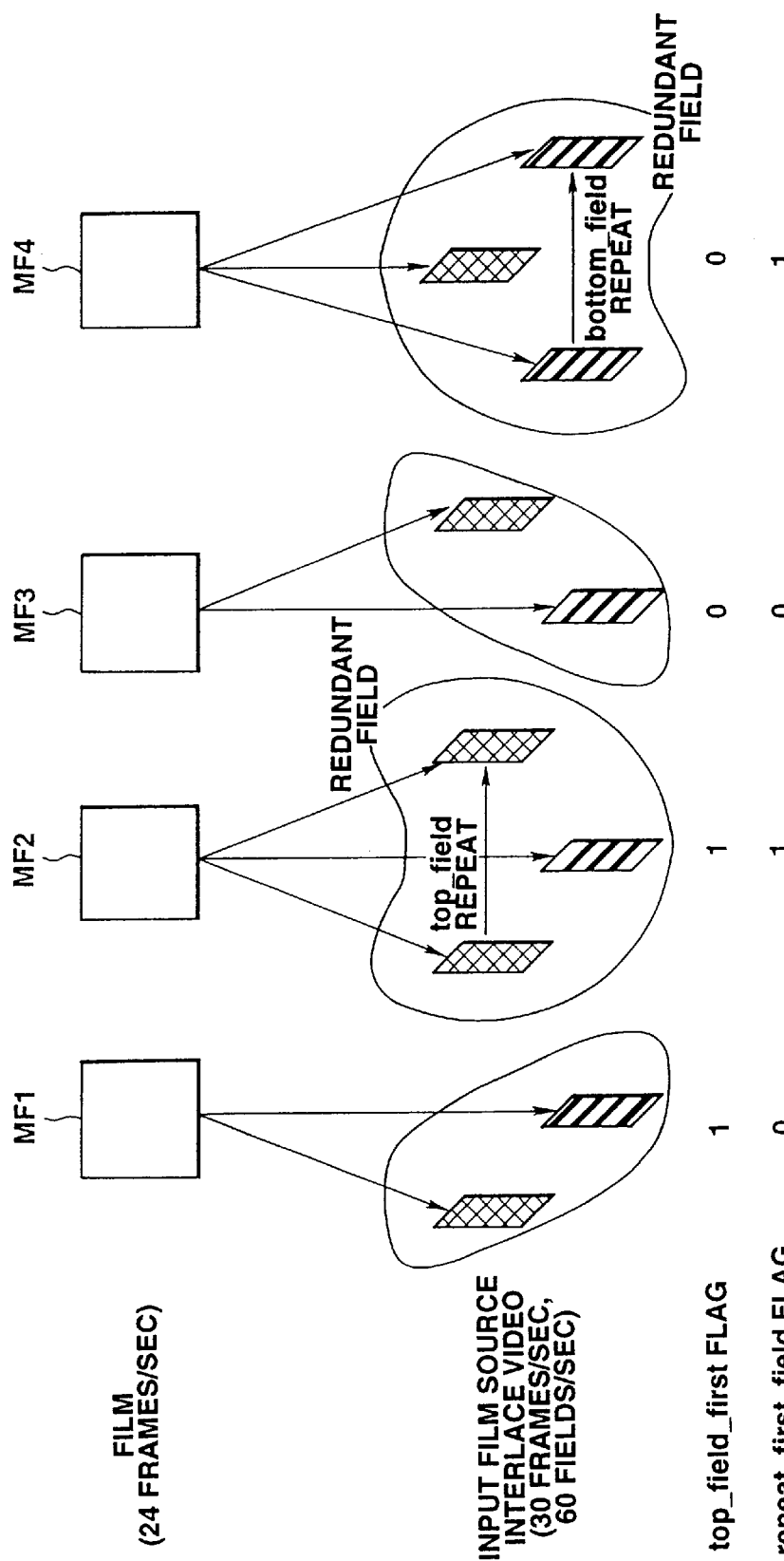
FIG. 5 illustrates the 3:2 pull-down system of reading out one picture frame of a motion picture source with 2 or 3 fields.

Based upon the position information having detected the redundant field, the display pattern of the input picture is classified into four types shown in FIG. 5 by two flags, that is a top_field_first flag and a repeat_first_field flag. The top_field_first flag specifies whether or not the top field has been read out first on executing 3:2 pull-down on a given picture frame of a motion picture film. The repeat_first_ field flag specifies whether or not a given picture frame of the motion picture film has been read out in three fields. The top_field first flag and the repeat_first_field flag are generated in an output field controller 312 and the information of at least two past display patterns are stored internally.

Figure 7:
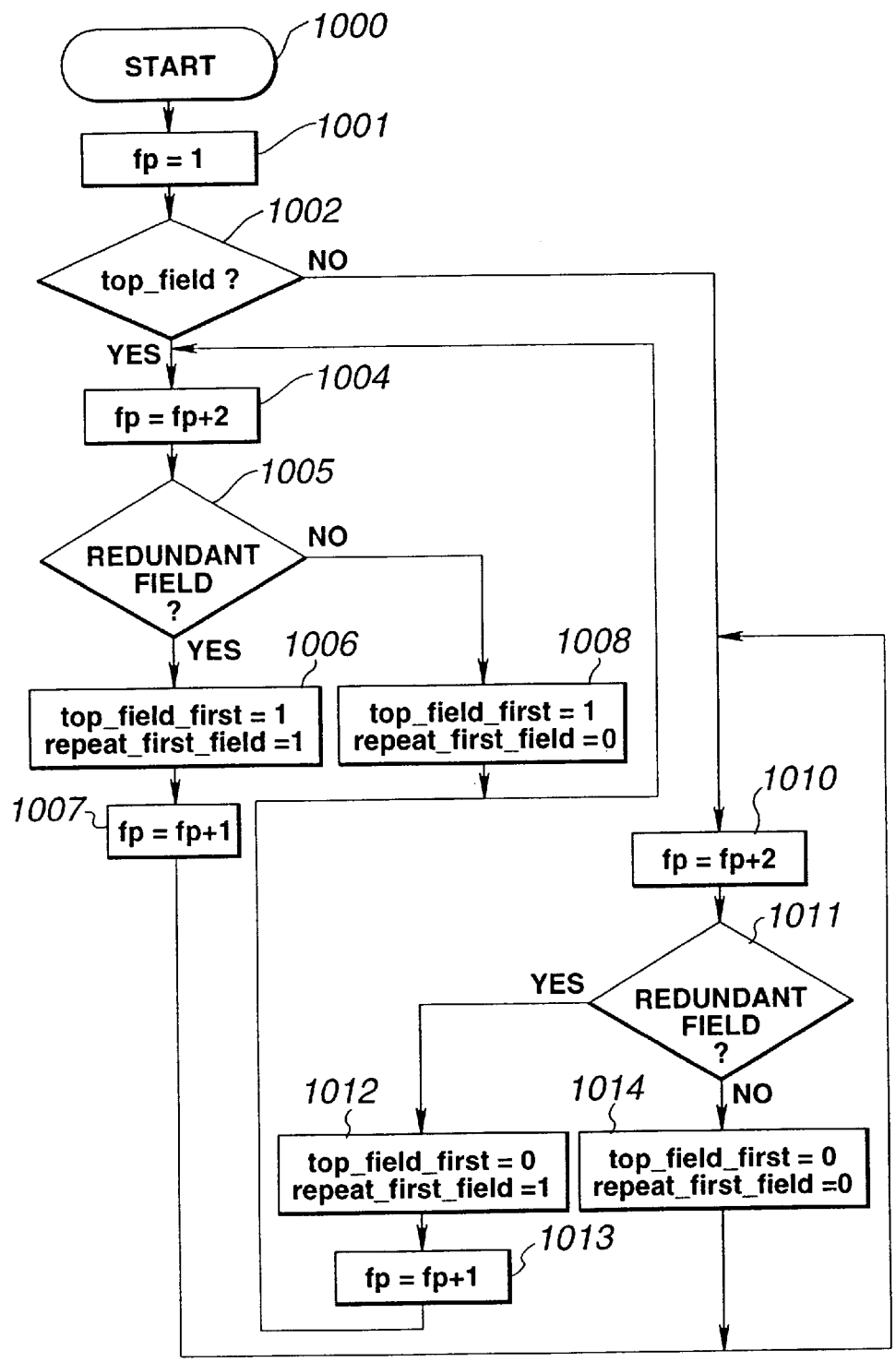
FIG. 7 is a flowchart for showing an illustrative operation of the pre-processor.

The algorithm of finding the top_field_first flag and the repeat_first_field flag by the output controller 312 is shown in FIG. 7. In FIG. 7, fp denotes the sequential number of the input fields S100 since the time they are supplied. Any addition to fp specifies that the time of the input field S100 progresses towards future. For example, fp=fp+2 denotes that the S100 time has progressed two fields towards future, that is the input of S100 has advanced by two fields.

The respective steps of the flowchart of FIG. 7 are explained. After the start of the operation at step 1000, a first field is entered at step 1001. It is then checked at step 1002 whether the parity of the field is for the top field or the bottom field. The processing is then branched to step 1004 or 1010.

If the result of judgment at step 1002 is YES, that is if the first field is the top field, control transfers to a field advanced by two fields towards future, in order to check at step 1005 whether or not the field is a redundant field. This is a decision as to whether or not the redundant field detection flag S212 of FIG. 6 is set. If the field is the redundant field, the display patterns of three previous fields, inclusive of the current field, are top_field_first=1 and repeat_first_ field=1 for the respective flags.

The position of the redundant field is set to detected_fp= fp (step 1006). The time for S100 is advanced by one field (step 1007). At the next processing operation, control transfers to the step for the field parity being for the bottom field (step 1010). If the field is judged at step 1005 not to be a redundant field, the display patterns of two previous fields not including the current field are top field_first=1 and repeat_first_field=0 for the respective flags (step 1008). The next processing operation transfers to a step 1004 for the field parity being for the top field.

If the result of the previous branching at step 1002 is NO, that is if the first field is the bottom field, control transfers to a field advanced by two fields towards future, in order to check at step 1011 whether or not the field is a redundant field. This is a decision as to whether or not the redundant field detection flag S212 of FIG. 6 is set.

If the first field is the redundant field, the display patterns of three previous fields, inclusive of the current field, are top_field_first=0 and repeat_first_field=1 for the respective flags. The position of the redundant field is detected_ fp=fp (step 1012). The time for S100 is advanced by one field (step 1013). At the next processing operation, control transfers to the step for the field parity for the top field (step 1004). If the field is judged at step 1005 not to be a redundant field, the display patterns of two previous fields not including the current field are top_field_first=0 and repeat_first_field=0 for the respective flags (step 1014). The next processing operation transfers to a step 1010 for the field parity for the bottom field.

By the above process, the output field controller 312 sets the respective flags top_field_first and repeat_first_field.

An illustrative operation of the output field controller 312 is explained by referring to FIG. 8.

In this figure, capital letters, such as "A" or "B", denote the top fields, whereas small letters, such as "a" or "b" denote the bottom fields. The interval shown by "|" denotes an input frame period. It is assumed that the redundant fields are detected at positions indicated by "*".

In the illustrative example of FIG. 8, the first field "A" of the input S100 is entered (fp=1) and is found to be top field (steps 1000 to 1003). The field "B" two fields towards future (fp=3) is not found to be redundant (steps 1003 to 1008). The field "B" further two fields towards future (fp=5) is found to be redundant (steps 1003 to 1006) and the time is advanced by one field (fp=6) at step 1007. The field "B" two fields further towards future (fp=8) is not found to be redundant (steps 1009 to 1014). The field "B" two fields further towards future (fp=10) is found to be redundant (steps 1009 to 1013). The above processing sets the display pattern as follows:

fp=1~2: top_field_first=1, repeat_first_field=0
fp=3~5: top_field_first=1, repeat_first_field=1
fp=6~7: top_field_first=0, repeat_first_field=0
fp=8~10: top_field_first=0, repeat_first_field=1

An output S210 is hereinafter explained.

The output S210 starts with a delay of 4 fields (2 frames) with respect to the input signal S100. The output S210 is controlled as shown in items (i) to (iv) below by the output field controller 312 sending a changeover control signal S207 to a changeover switch 316 based upon the top field_first and repeat first_field flags set on the output field controller 312:

(i) With top$_{field}$_first=1 and repeat-first_field=0;

the field signal S208, delayed by 4 fields, is sequentially outputted by two fields. These fields are of the first frame |A a| of the field signal S208.

(ii) With top_field_first=1 and repeat_first_field=1;

the field signal S208, delayed by 4 fields, is sequentially outputted by two fields. These fields are of the second frame |B b| of the field signal S208 in the example of FIG. 8. The top field of the third input frame is a redundant field and hence is removed without being outputted.

(iii) With top_field_first=0 and repeat_first_field=0;

the field signal S200, delayed by 2 fields, is outputted, and subsequently the field signal S208, delayed by 4 fields, is outputted. In the example of FIG. 8, the field signal S200 is outputted at a position of the top field top_field "B" of the third frame of the field S208 which is redundant and hence removed. That is, the top field "C" of the fourth frame of the field signal S208 is previously stuffed and outputted. The bottom field bottom_field of the third input frame of the field signal S208 is then outputted. As for the input S100, the bottom field "c" is temporally ahead of the top field top_field "C", these two fields not making up a frame. However, at an output S103, the top field is temporally at a previous position so that an output frame |C c| is produced.

(iv) With top_field_first=0 and repeat_first_field=1;

two invalid fields or one invalid frame is outputted, followed by two fields of the field signal S208 delayed by 4 fields. In the example of FIG. 8, if a redundant field is detected at a bottom field, such as bottom_field "d" of the fifth frame of the signal S100, two invalid fields are outputted at the output S103. This is shown in FIG. 8 by |x|. Next, |D d| is outputted at the signal S208.

As shown by the above items (i) to (iv), the output controller 312 changes over the switch 316 in order to control the output S210. In the column "quantity of field delay" in FIG. 8, there is shown the delay quantity of the respective fields of the output S210 with respect to the signal S100. The values 4, 2 and x denote outputs of the field signal S208 and S200 and invalid fields.

Two consecutive fields of the output S210 represent an output frame. To each output frame, there is appended the frame header information by a frame header multiplexer 313, and the resulting signal S103 is outputted at a terminal 314. The contents of the header include a top_field_first flag, a repeat first_field flag and an invalid frame flag, shown as disabled frame_flag. Illustrative examples of the header information appended to the respective flags are shown in the column "top field_first flag and repeat first_field flag" in FIG. 8.

In output frames of S210 and S103, the top field is outputted first, with its frame period being locked with the frame period of the synchronization input signal S105.

In the foregoing explanation, the invalid frames are inserted to be synchronized with the frame synchronization signal. However, the invalid fields may also be inserted to be synchronized with the field synchronization signal, in which case the two invalid frames may be inserted at any arbitrary position if the field rate of 60 Hz is observed, there being no necessity of the two fields being inserted consecutively.

Meanwhile, if the switches 209, 210 in FIG. 4 are turned off, the signal S100 is an interlacing signal in which usual top_field not processed with 3:2 pull-down is entered first.

In such case, the frame header represents the default contents, in which top_field_first=1, repeat_first_field=0 and disabled_frame_flag=0 at all times.

Without regard to the on/off states of the switches 209, 210 of FIG. 4, the signals S100 and S103 may be used as an input S104 to an encoder 203, operating with the synchronization input S105 as a master clock signal.

The input S104 is processed in many ways by the encoder 203 and the local decoder 205 which represent core portion of the motion picture encoding system. It is noted that the frames designated as invalid frames in the respective frame headers of the input S104 are not processed as valid frames. An illustrative processing operation in such case will be explained subsequently.

Figure 9:
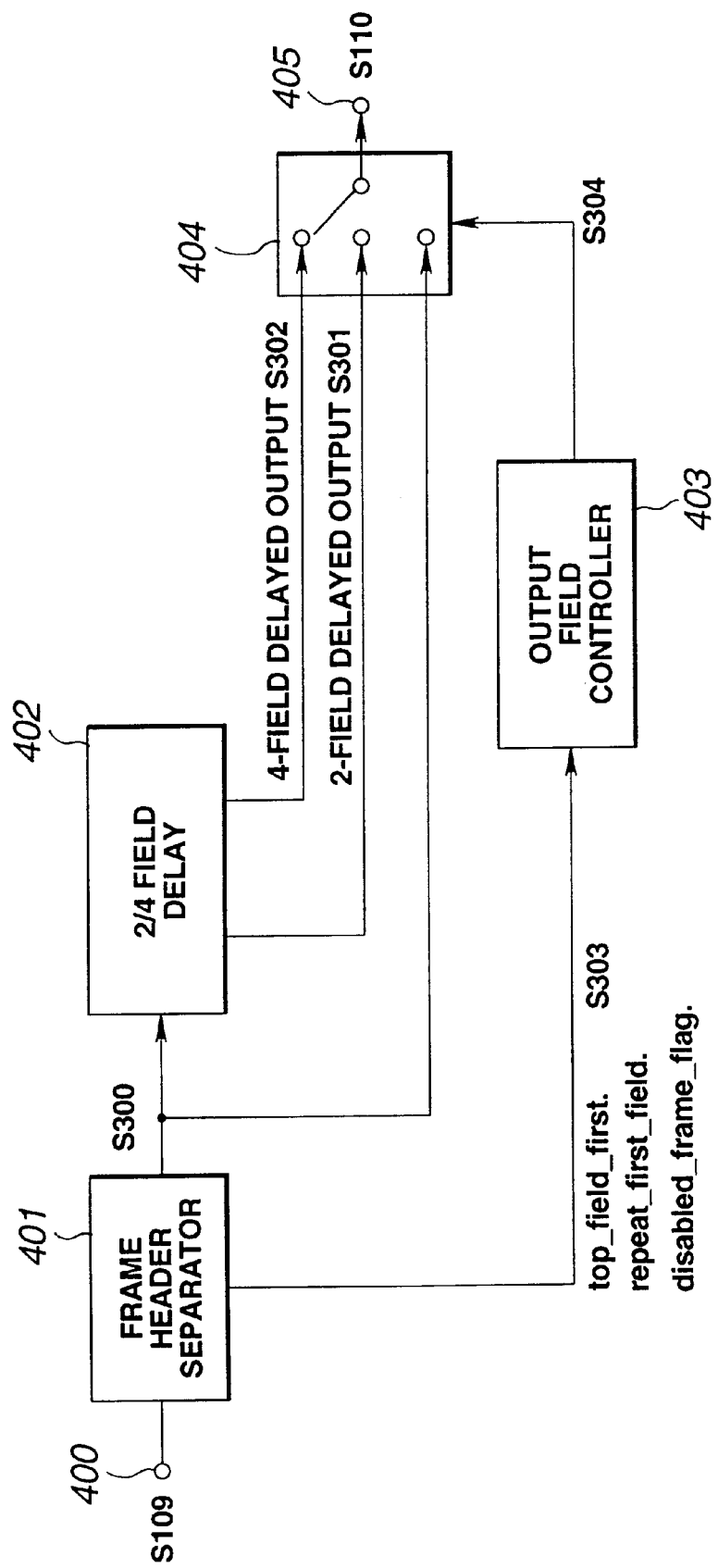
FIG. 9 is a block circuit diagram showing an illustrative construction of a post-processor.

The method for outputting the output S109 from the local decoder 205 to the picture outputting device 207 is explained. Referring to FIG. 9, a post-processor 206, fed with the output S109, is explained.

Referring to FIG. 9, the locally decoded output S109, entering a terminal 400, is sent to a frame header separator 401 where the header contents S303 of the respective frames are read out and sent to an output field controller 403. In the output field controller 403, the information of at least one past display pattern of the header contents is stored. The header contents include the flags top_field_first, repeat_first_field and disabled_frame_flag.

Meanwhile, if the switches 211, 212 shown in FIG. 4 are off, Sill is an interlacing signal in which the usual top-field not processed with 3:2 pull-down is first entered.

In such case, the frame header becomes the default, such that top field_first=1, repeat_first_field=0 and disabled_frame_flag=0 at all times.

Based upon the frame header contents, the output field controller 403 of FIG. 4 causes a switch 404 to switch between three signals, namely a current input field S300, a field signal S301 with a delay of 2 fields or 1 frame and a field signal S302 with a delay of 4 fields or 2 frames, outputted by a delay unit 402.

Figure 10:
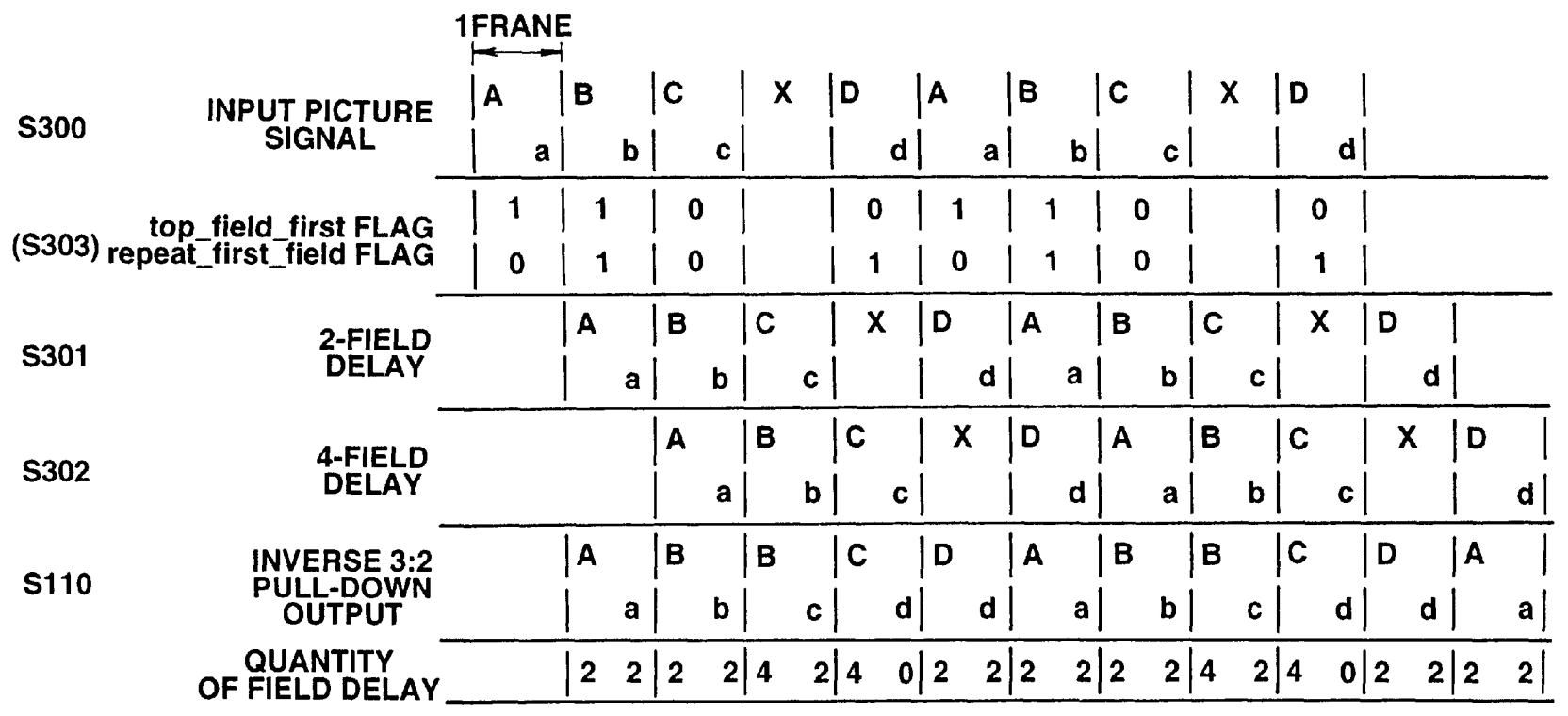

An illustrative operation of the post-processor, in particular the output field controller 403 of FIG. 9, is explained by referring to FIG. 10.

In this figure, capital letters, such as "A" or "B", denote the top fields, whereas small letters, such as "a" or "b" denote the bottom fields. The interval shown by "|" denotes an input frame period.

The picture output S110 starts with a delay of 2 fields or 1 frame with respect to the input signal S300. The outputting is controlled as shown in items (i) to (v) below in accordance with top_field_first, repeat_first_field and disabled_frame_flag set in the output field controller 403.

(i) top_field_first=1, repeat_first_field=0 and disabled_frame_flag=0;

the field signal S301, delayed by 1 frame, is sequentially outputted by two fields. In the present example, shown in FIG. 10, these fields are of the first frame |A a| of the field signal S301.

(ii) top_field_first=1, repeat_first_field=1 and disabled_frame_flag=0;

the field signal S301, delayed by 1 frame, is sequentially outputted by two fields. Then, the field signal S302, delayed by 2 frames, is outputted by one field. In the example of FIG. 10, the second frame |B b| of the field signal S301 is outputted, followed by top field "B" of the second frame of the field signal S302.

(iii) top_field_first=0, repeat_first_field=0 and disabled_frame_flag=0;

the field signal S301, delayed by 1 frame, is outputted by one field. Then, the field signal S302, delayed by 2 frames, is outputted. In the example of FIG. 10, the bottom field "c" of the third frame of the field signal S301 is outputted, followed by top field "C" of the third frame of the field signal S302.

(iv) disabled_frame_flag=1;

no signal is outputted.

(v) top_field_first=0, repeat_first_field=1 and disabled frame_flag=0;

the current input field S300 is outputted by one field, followed by two fields of the field signal S301 delayed by one frame.

As shown by the above items (i) to (v), the output controller 403 changes over the switch 404 in order to control the output S10. In the column "quantity of field delay" in FIG. 10, there is shown the delay quantity of the respective fields of the output S110 with respect to the output S100. The values 4, 2 and 0 denote outputs of S302, S301 and S300, respectively.

Returning to FIG. 4, an output S112, obtained via the local decoder 205, switch 211, post-processor 206 if necessary, and the switch 212, may be displayed on a monitor 207 as a picture outputting device.

The above is the operation of the input/output of the moving pictures of the moving picture processing system shown in FIG. 4.

In the foregoing description, the invalid signal inserted into picture signals entering the encoder is an invalid frame, and an invalid frame flag is appended to the frame header information. However, the invalid signal units may also be fields, micro-blocks or pixels, in which case a flag specifying that such unit is an invalid signal is appended to each unit as the subsidiary information.

Also, in the foregoing description, the synchronization input period of the input picture is one frame time period. However, the synchronization input period may also be one field time period or one pixel time period.

In the above description of the picture inputting device 201 and the encoder 203, the top field represents the first entered interlaced signal. Conversely, with the picture inputting device 201 and the encoder 203, the bottom field may also represent the first entered interlaced signal, in which case it suffices to interchange the sequence of the top field which is an odd-field and the bottom field which is an even-field.

For example, the signals S210 and S300 are interlaced signals in which it is the bottom_field_first flag that is first entered.

Next, the processing at the encoder 203 and the local decoder 205, constituting a moving picture encoder as a core portion of the moving picture encoding system of FIG. 4, is hereinafter explained.

The moving picture encoder implements a hybrid encoding method consisting in a combination of motion compensated prediction coding and DCT well-known as MPEG 2 (ISO/IEC 13818-2). With the MPEG 2, pictures of respective frames are I-pictures, P-pictures or B-pictures, and picture signals are encoded by compression encoding.

Figures 11A, 11B:
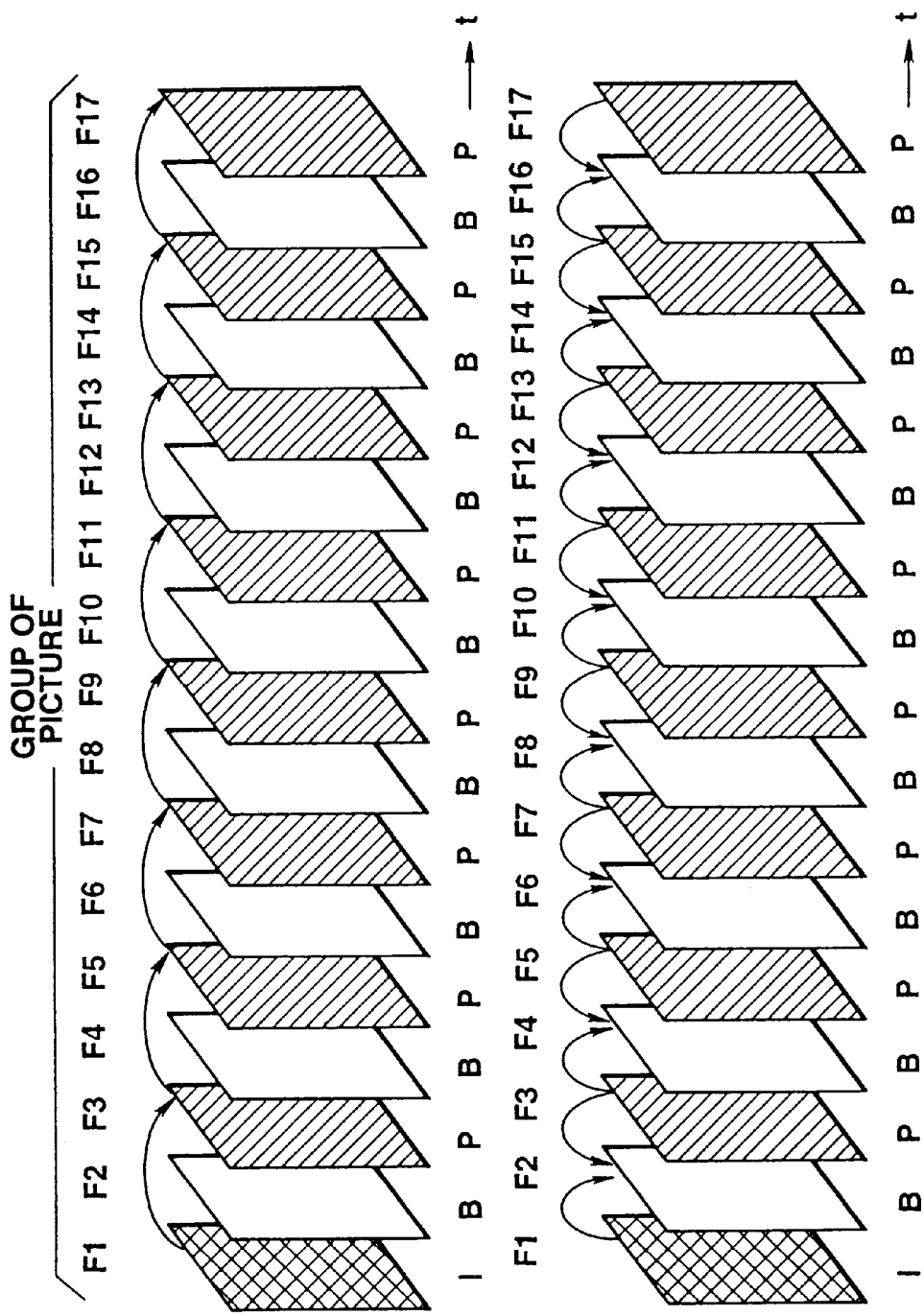
FIGS. 11A, 11B are timing charts for showing an illustrative operation of the post-processor.

That is, picture signals of 17 frames, that is frames F1 to F17, are grouped together as a group-of-picture, which is a processing unit. For example, picture signals of the leading frame F1, second frame F2 and the third frame F3 are encoded as I-picture, as B-picture and as P-picture, respectively, as shown in FIG. 11A. The fourth and following frame F4 to F17 are alternately processed as B-pictures or P-pictures.

As for the picture signals for the I-picture, the one-frame picture signals are directly transmitted. As for the picture signals of the P-picture, the difference from the picture signals of the temporally past I-picture or P-picture is transmitted, as shown in FIG. 11A. As for the picture signals of the B-picture, the difference from the mean value of the picture signals of the temporally past frame and the picture signals of the temporally future frame is found and encoded.

Figure 12:
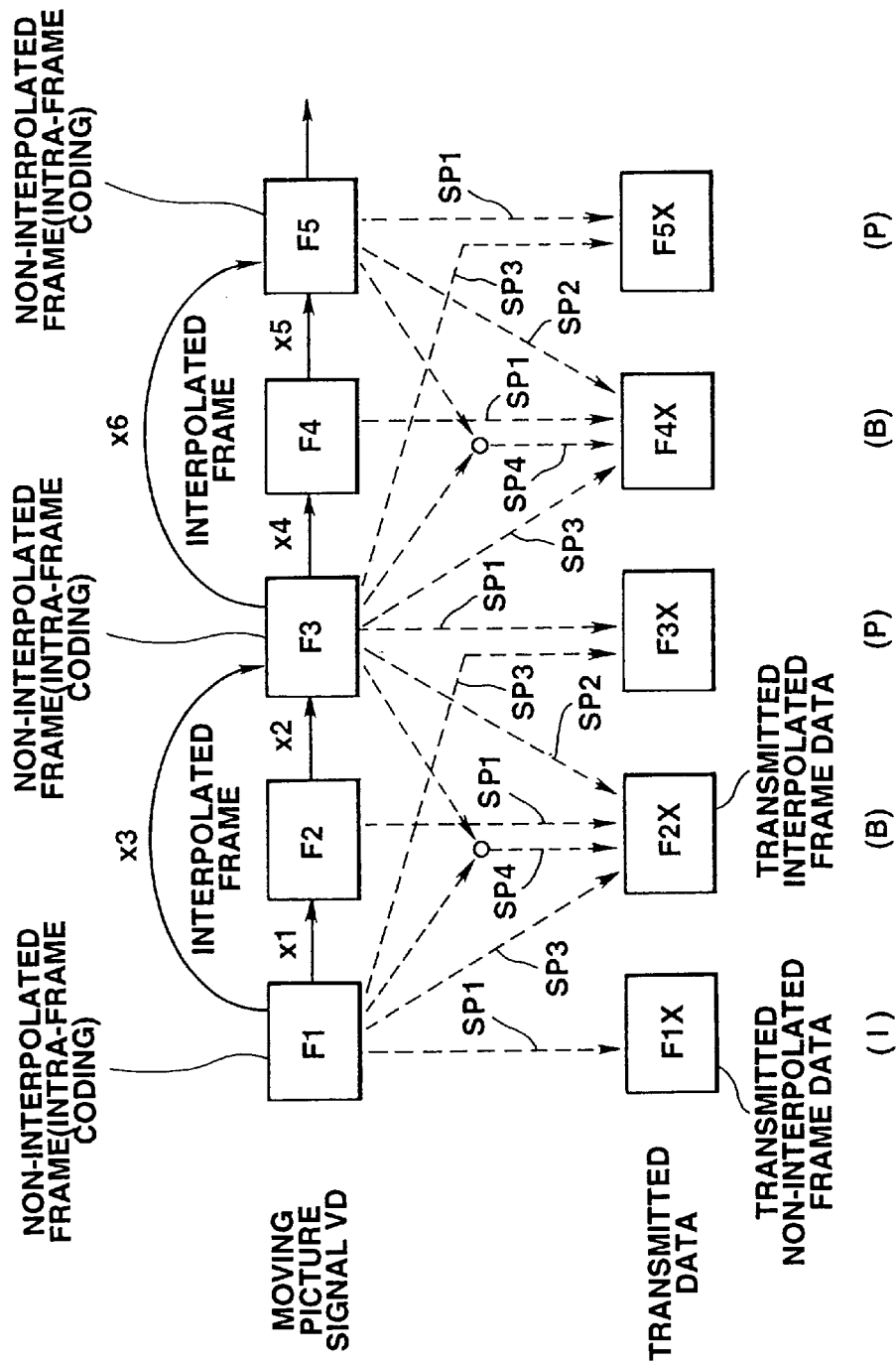
FIG. 12 shows an illustrative method for encoding moving pictures.

FIG. 12 shows the method for encoding the moving picture signals. As shown therein, since the first frame F1 is processed as the I-picture, it is directly transmitted as transmitted data F1X on the transmission route (intra-picture coding). Conversely, since the second frame F2 is processed as the B-picture, the difference between the mean value of the past frame F1 and the mean value of the future frame F3 is calculated, and the resulting difference is transmitted as transmission data F2X.

More specifically, there exist four sorts of processing as the B-picture. The first processing is to transmit data of the original frame F2 directly as transmitted data F2X (SP1) by way of performing intra-coding. This processing is similar to that for the I-picture. The second processing is to calculate the difference from the future frame F3 and to transmit the difference SP2, by way of performing backward predictive coding. The third processing is to transmit the difference from the past frame F1 (SP3) by way of performing forward predictive coding. Finally, the fourth processing is to generate a difference from a mean value of the past frame F1 and the future frame (SP4) and to transmit the difference as transmission data F2X by way of performing bi-directional predictive coding.

Of these four methods, a method which minimizes the quantity of transmission data is selected.

For transmitting the difference data, a motion vector x1 between the frames F1 and F2, that is between the picture of the current frame and the prediction picture (the picture of the frame the difference of which from the current picture is to be calculated) is transmitted along with the difference data for forward predictive coding. Similarly, a motion vector x2 between the frames F3 and F2 is transmitted along with the difference data for backward predictive coding, while both the motion vector x1 and the motion vector x2 are transmitted along with the difference data for bi-directional predictive coding.

As for the frame F3 of the P-picture, the difference signal SP3 between the frame F3 and the temporally past frame F1 as the prediction picture, and the motion vector x3, are calculated, and transmitted as transmission data F3X, by way of performing forward predictive coding. Alternatively, data of the original frame D3 are directly transmitted as transmission data F3X (SP1) by way of performing intra-coding. One of these methods is selected which will minimize the quantity of transmitted data, as in the case of the B-picture.

Figure 13:
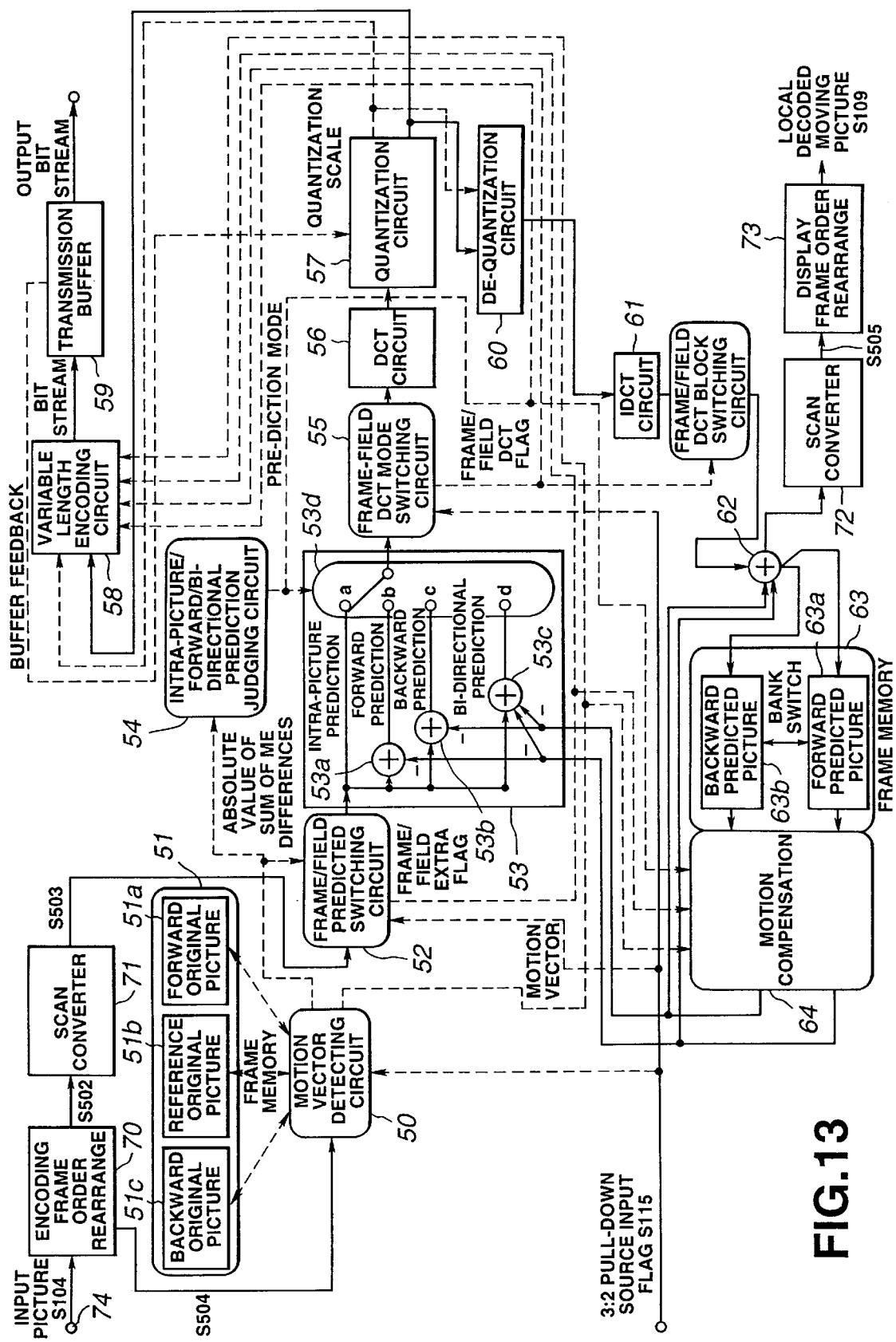
FIG. 13 is a block circuit diagram showing an illustrative encoder for encoding moving pictures.

Referring to FIG. 13, an illustrative construction of the moving picture encoding device (encoder) is explained. Although not shown precisely, the present encoder is operated by being locked to the picture synchronization input S105, shown in FIG. 4.

From a terminal 74, an input frame S104 having a frame header is entered, as well as, from a terminal 75, a flag S115, indicating whether or not the input moving picture fed from the picture input device is derived from a film source by 3:2 pull-down.

The input picture S104 is entered to a picture encoding type designating and picture encoding sequence rearranging unit 70, which then designates one of the I-, P- and B-pictures in terms of which the pictures of the sequentially entered frames are to be processed. For example, the group-of-picture constituted by the frames F1 to F17 are processed as I, B, P, B, P, . . . B, P, as shown in FIG. 11. The designated picture encoding types are written in the respective frame headers.

The input pictures are then rearranged in the encoding sequence in accordance with the designated picture encoding types. The reason of rearranging the input pictures is that, since the B-picture is encoded by backward prediction, coding becomes impossible unless the I-picture or the P-picture as the backward prediction picture is prepared in advance. Thus the future I-picture or P-picture has to be encoded before encoding the B-picture. Therefore, the picture sequence is rearranged to F1, F3, F2, F5, F4, . . . if the picture encoding types are designated as shown for example in FIG. 11.

The manner of handling the input frame (input picture or input picture string) S104 in the picture encoding type designating and picture encoding sequence rearranging unit 70 in case the input picture S104 contains an invalid frame, designated by the frame header disabled_frame_flag, is explained.

It is assumed that the input picture S104 made up of F1 to F13 is entered, as shown in FIG. 14, in which "X" denotes an invalid frame. The picture encoding types are sequentially designated as in a picture string S501 as the invalid frames are disregarded. The numbers in the picture string S501 denote the sequence of designation of the picture encoding types. The pictures are then rearranged in the encoding sequence in accordance with the picture encoding types. Thus the picture string S502 is rearranged as shown in a picture string S502. In the present case, the signal string S502 is started with a delay of two frames relative to the picture sting S104.

Figure 15:
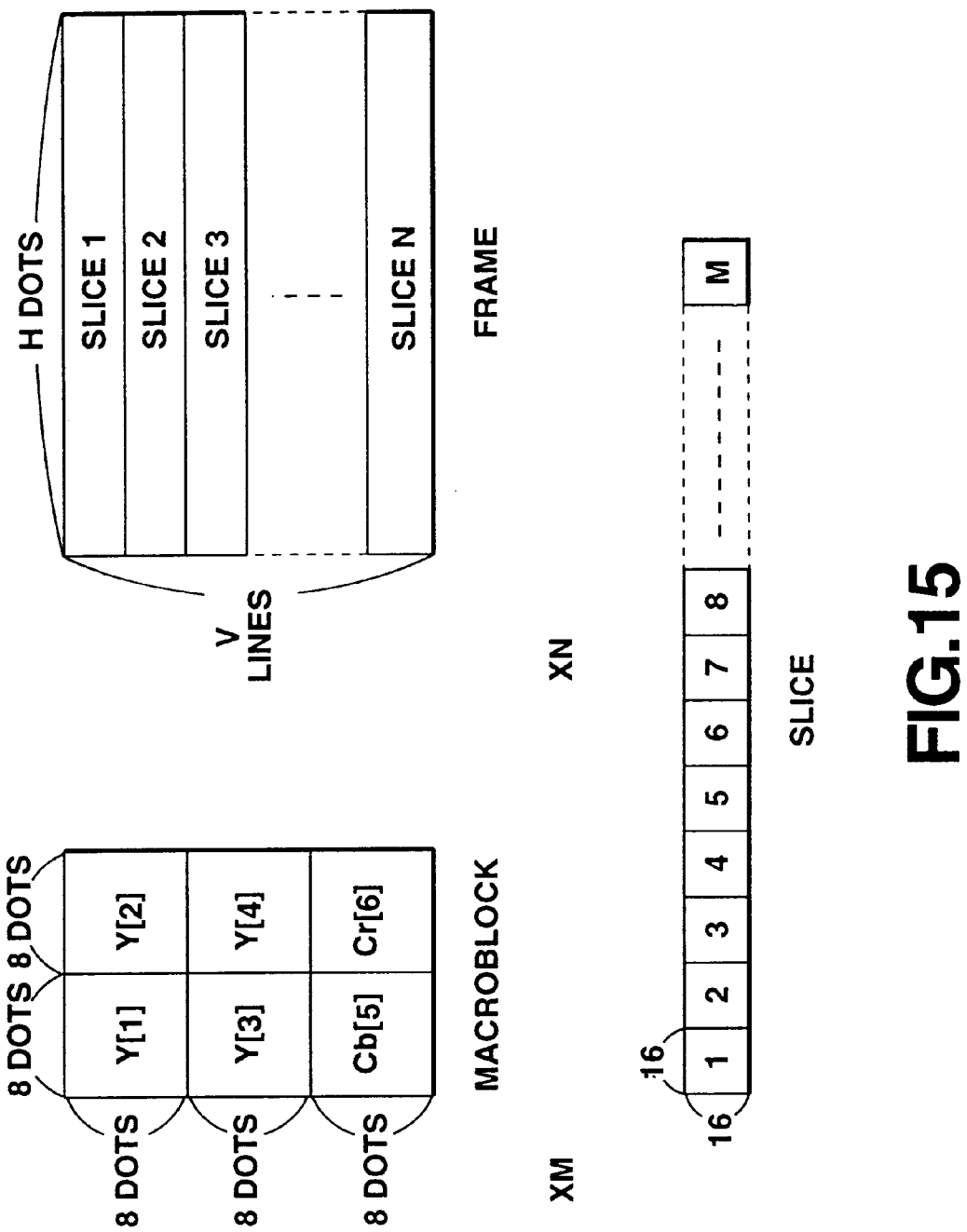
FIG. 15 illustrates the construction of picture data.

The rearranged picture string S502 enters the scan converter 71 where the pictures entered by raster scan are converted into block-format signals. That is, the picture entered by raster scanning is comprised of V lines each consisting of H dots as shown in FIG. 15. The scan converter 71 splits the 1-frame signals into M slices, each slice consisting of 16 lines as a unit. Each slice is split into macro-blocks. Each macro-block is made up of luminance signals corresponding to 16×16 pixels (dots), which are further split into blocks Y[1] to Y[4] each consisting of 8×8 dots. These 16×16 dot luminance signals are associated with 8×8 dot Cb signals and 8×8 dot Cr signals.

On the other hand, for executing motion prediction for the frame S502 being encoded, a reference picture S504 is supplied to the motion vector detection circuit 50. The motion vector detection circuit 50 processes the picture data of the respective frames as the I-pictures, P-pictures or as B-pictures, in accordance with the instructions from the picture encoding type designating and picture encoding sequence rearranging unit 70. The picture data of a frame processed as an I-picture, such as frame F1, is transferred from the motion vector detection circuit 50 to a forward original picture unit 51a of the frame memory 51 for storage therein. The picture data of the frame processed as the B-picture is transferred to and stored in an original picture unit 51b, while the picture data of the frame processed as the P-picture is transferred to and stored in a backward original picture unit 51c.

If, at the next timing sequence, the picture of a frame to be processed as the B-picture (frame F4) or as the P-picture (frame F5) is supplied, the picture data of the first P-picture (frame F3) so far stored in the backward original picture unit 51c is transferred to the forward original picture unit 51a. The next B-picture (frame F4) is stored (by overwriting) in the original picture unit 51b, while the P-picture next to the B-picture is stored (by overwriting) in the backward original picture unit 51c. The above operations occur sequentially.

Meanwhile, if the frame S502 is an invalid frame, the motion vector detection circuit 50 waits during a one-frame period without performing any processing.

The macro-block read out from the scan converter 71 is processed with frame prediction mode processing or field prediction mode processing by a prediction mode switching circuit 52. The macro-blocks thus processed are processed by a calculating unit 53 with intra-coding, forward predictive coding, backward predictive coding or bi-directional predictive coding, under control of a prediction decision circuit 54. Which of these processing operations is to be executed is determined in dependence upon a prediction error signal, that is a difference between a picture to be processed, or a reference picture, and a prediction picture therefor. Thus the motion vector detection circuit 50 generates a sum of absolute values of prediction error signals used for this decision.

The frame prediction mode and the field prediction mode in the prediction mode switching circuit 52 is hereinafter explained.

Figure 16:
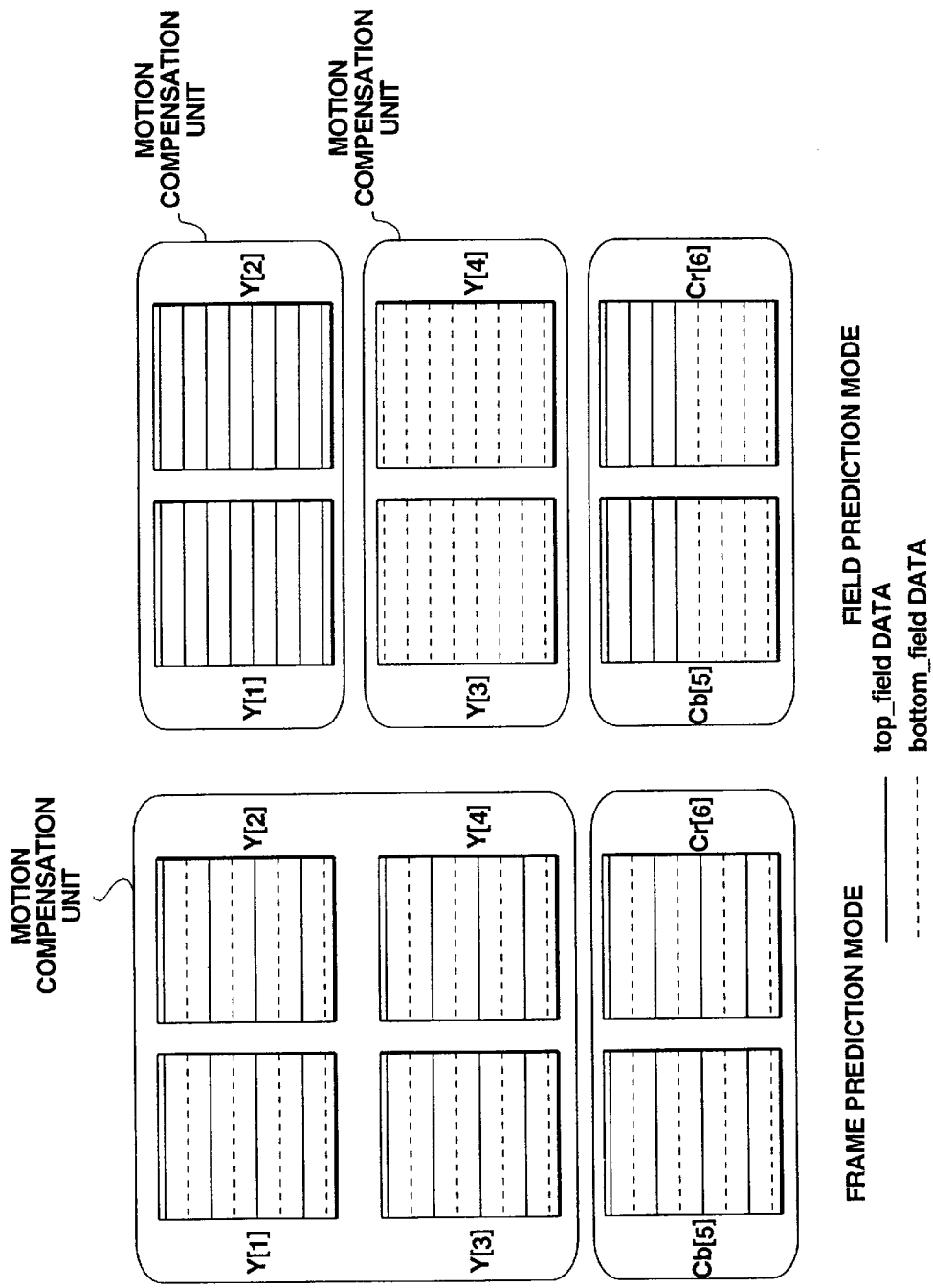
FIGS. 16A, 16B illustrate a frame/field prediction mode.

If the frame prediction mode has been set, the prediction mode switching circuit 52 directly outputs the four luminance blocks Y[1] to Y[4] supplied from the scan converter 71 to the downstream side calculating unit 53. In this case, top-field line data and bottom-field line data exist together in each luminance block, as shown in FIG. 16A. With this frame prediction mode, prediction is executed on four luminance blocks (macro-block) as a unit and each motion vector is associated with these four luminance blocks.

Conversely, the prediction mode switching circuit 52 operated so that the luminance blocks Y[1] and Y[2], among the four luminance blocks, supplied thereto from the scan inverter 71 in a configuration shown in FIG. 16A, will be constituted solely by data of the top field line, while the remaining two luminance blocks Y[3] and Y[4] will be constituted solely by data of the bottom field line, these being then outputted to the calculating unit 53, as shown in FIG. 16B. In such case, a single motion vector is associated with the two luminance blocks Y[1] and Y[2], while another motion vector is associated with the remaining two luminance blocks Y[3] and Y[4].

For the frame prediction mode, the chroma signals are supplied to the calculating unit 53 in a state in which top field line data and bottom field line data exist together, as shown in FIG. 16A. For the field prediction mode, upper four lines of chroma blocks Cb and Cr become top field chroma signals associated with the luminance blocks Y[1], Y[2], while lower four lines of the chroma blocks Cb and Cr become bottom field chroma signals associated with the luminance blocks Y[3], Y[4], as shown in FIG. 16B.

The motion vector detection circuit 50 outputs the sum of absolute values of prediction errors for the frame prediction mode and the sum of absolute values of prediction errors for the field prediction mode to the prediction mode switching circuit 52. The prediction mode switching circuit 52 compares the sums of the absolute values of the prediction errors for the frame prediction mode and for the field prediction mode and executes the processing for the prediction mode having the smaller value. The resulting data is supplied to the calculating unit 53.

If a 3:2 pull-down source input flag S115 has been set, the input frame S104 is of the progressive structure, so that the prediction mode is set to the frame prediction mode.

The motion vector detection circuit 50 generates in the prediction decision circuit 54 the sum of absolute values of the prediction errors for determining which of the intra-coding, forward predictive coding, backward predictive coding or the bidirectional coding is to be executed.

That is, the motion vector detection circuit 50 finds, as the sum of the absolute values of the prediction errors of intra-picture coding, the sum of absolute values of differences between signals Aij of the macro-block of the reference picture and a mean value Aav of the macro-block signals Aij, or $\Sigma|Aij-Aav|$. The motion vector detection circuit 50 also finds, as the sum of the absolute values of the prediction errors of forward predictive coding, the sum of absolute values of differences between signals Aij of the input macro-block and the signal Bij of the macro-block of the prediction picture, or $\Sigma|Aij-Bij|$. The sum of the absolute values of the prediction errors of the backward prediction and bidirectional prediction is found in a similar manner except that the prediction picture is different from that for forward prediction.

These sums of the absolute values are supplied to the prediction decision circuit 54 which then selects the smallest one of the sums of the absolute values of the prediction errors of the forward prediction, backward prediction and bidirectional prediction as the sum of the absolute values of the prediction errors for the inter-picture prediction. The prediction decision circuit 54 then compares the sum of the absolute values of the prediction errors for the inter-picture prediction to the sum of the absolute values of the prediction errors of the intra-picture coding and selects the smaller one of the sums of the absolute values in order to select the mode corresponding to the selected sum value as the prediction mode. That is, if the sum of the absolute values of the prediction errors of the intra-picture coding is smaller, the intra-picture prediction mode is set. If the sum of the absolute values of the prediction errors for the inter-picture prediction is smaller, the mode having the smallest sum of the absolute values, among the forward prediction mode, backward prediction mode and the bidirectional prediction mode, is set.

Thus the motion vector detection circuit 50 detects the motion vector between the reference picture and the prediction picture associated with one of the four prediction modes selected by the prediction decision circuit 54, and outputs the detected motion vector to a variable length encoding circuit 58 and to a motion compensation circuit 64. Such a motion vector having the smallest value of the sum of the absolute values of the prediction errors is selected.

When a picture of a frame to be processed as an I-picture is entered, the intra-frame prediction mode, that is a mode not executing motion prediction, is set, and a switch 53d of the calculating unit 53 is set to a fixed contact a. This permits the picture data of the I-picture to enter a DCT mode switching circuit 55.

Figure 17:
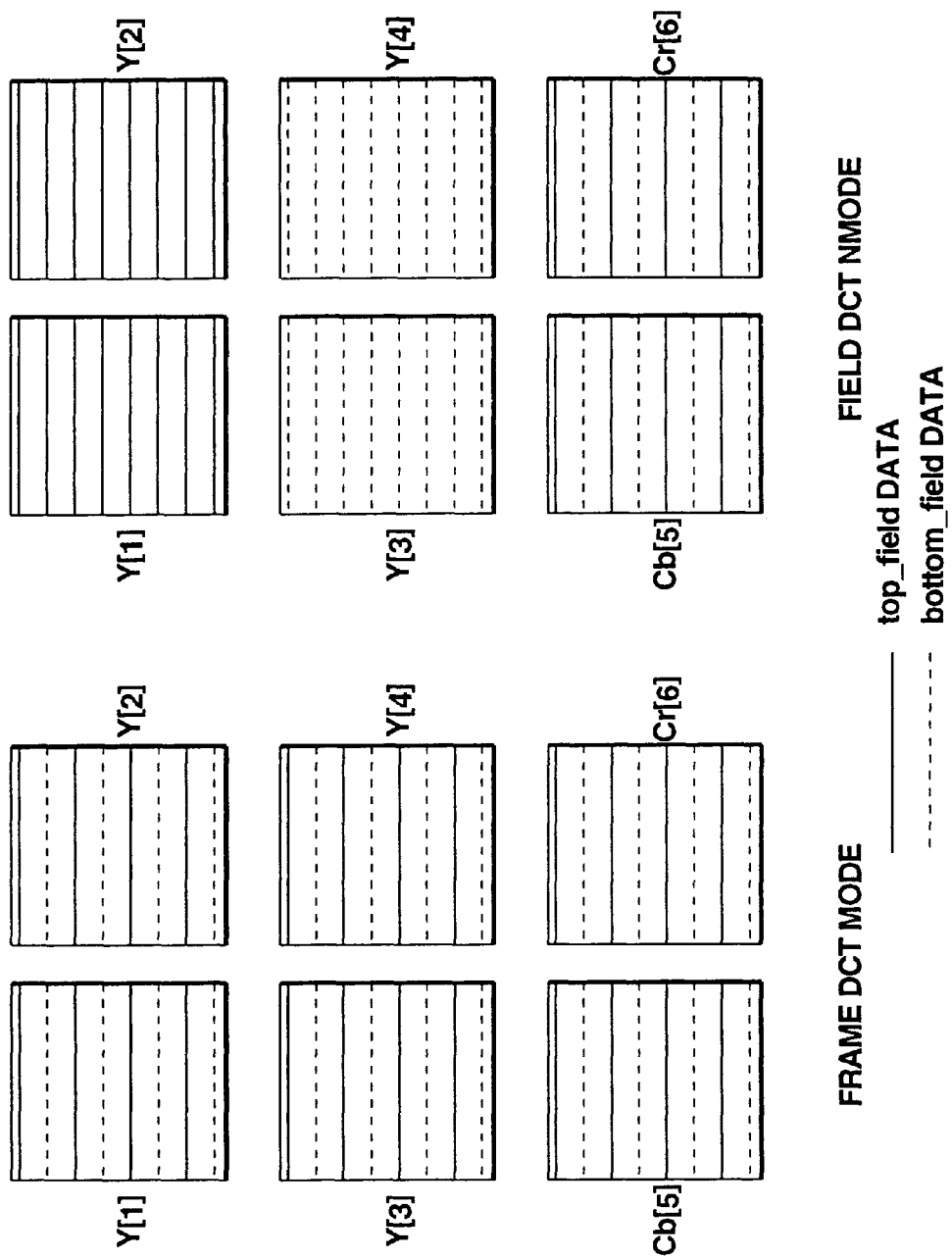
FIGS. 17A, 17B illustrate the frame/field DCT mode.

The DCT mode switching circuit 55 sets data of the four luminance blocks to a state in which top field lines and bottom field lines exist together (frame DCT mode) or a state in which top field lines and bottom field lines are separated from each other (field DCT mode), and outputs the data to a DCT circuit 56, as shown in FIGS. 17A or 17B.

That is, the DCT mode switching circuit 55 compares the encoding efficiency for the case in which the top field data and the bottom field data are DCTed in an intermingled state and that for the case in which the top field data and the bottom field data are DCTed in a separated state, and selects a mode exhibiting a better encoding efficiency.

For example, the input signal configuration is such a configuration in which the top field lines and the bottom field lines are in a commingled state, as shown in FIG. 17A. The difference between signals of the vertically neighboring top field and bottom field lines is calculated and the sum of absolute values of the differences or the sum of square values of the differences are found. Also, the input signal configuration is such a configuration in which the top field lines and the bottom field lines are in a separated state, as shown in FIG. 17B. The difference between signals of the vertically neighboring top field and bottom field lines is calculated and the sum of absolute values of the differences or the sum of square values of the differences are found. The two sums of the absolute values are compared to each other and the DCT mode for the smaller value of the sums is set. That is, if the former sum is smaller, the frame DCT mode is set, whereas, if the latter sum is smaller, the field DCT mode is set.

Then, data of the configuration associated with the selected DCT mode are outputted to the DCT circuit 56, and a DCT flag specifying the selected DCT mode is outputted to a variable length coding circuit 58 and to a motion compensation circuit 64.

If the 3:2 pull-down source input flag S115 is set, the input frame S104 is of a progressive structure, so that the DCT mode is set to the frame DCT mode.

It is seen on comparison of the prediction mode in the prediction mode switching circuit 52 shown in FIGS. 16A and 16B and the DCT mode in the DCT mode switching circuit 55 shown in FIGS. 17A and 17B that the data structure in these two modes are substantially identical with each other.

The picture data of the I-picture outputted by the DCT mode switching circuit 55 is supplied to the DCT circuit 56 where it is DCTed and converted into DCT coefficients. These DCT coefficients are fed to a quantization circuit 57 and quantized with a quantization step associated with the quantity of data stored in a transmission buffer 59 so as to be fed to the variable length coding circuit 58.

From the frame header information, the variable length coding circuit 58 transmits the picture encoding type, top__field first and repeat__first__field.

The variable length coding circuit 58 is responsive to the quantization step or scale supplied from the quantization circuit 57 to convert picture data supplied from the quantization circuit 57, herein data of the I-picture, into variable length codes, such as Huffman codes, and to output the converted data to the transmission buffer 59.

The variable length encoding circuit 58 also variable length encodes input data, that is the quantization step or scale supplied from the quantization circuit 57, the prediction modes supplied from the prediction decision circuit 54, that is the modes specifying which one of the intra-picture coding, forward predictive coding, backward predictive coding and bidirectional predictive coding has been set, the prediction flag supplied from the prediction mode switching circuit 52, that is a flag specifying which one of the frame prediction mode and the field prediction mode has been set, and the DCT flag outputted by the DCT mode switching circuit 55, that is the flag specifying which one of the frame DCT mode and the field DCT mode has been set.

However, if the 3:2 pull-down source input flag S115 has been set, both the prediction flag and the DCT flag are fixed values of the frame mode, so that these flags are not outputted by the variable length coding circuit 58. Instead, the variable length coding circuit transmits the information that the flag S115 has been set, that is that the input frame is of the progressive structure.

The transmission buffer 59 temporarily stores the input data and outputs data corresponding to the stored quantity to the quantization circuit 57.

If the residual data quantity in the transmission buffer 59 is increased to an allowable upper limit, the transmission buffer increases the quantization scale of the quantization circuit 57 by the quantization control signal for decreasing the data quantity of the quantized data. Conversely, if the residual data quantity in the transmission buffer 59 is decreased to an allowable lower limit, the transmission buffer decreases the quantization scale of the quantization circuit 57 by the quantization control signal for increasing the data quantity of the quantized data. This prohibits overflow or underflow from being produced in the transmission buffer 59.

The data stored in the transmission buffer 59 is read out at a pre-set timing sequence so as to be outputted to a transmission path.

On the other hand, data of the I-picture outputted by the quantization circuit 57 are supplied to a dequantization circuit 60 so as to be dequantized in accordance with the quantization step supplied from the quantization circuit 57. An output of the dequantization circuit 60 is fed to an inverse DCT (IDCT) circuit 61 and thereby inverse DCTed so as to be then supplied to and stored in a forward predicted picture portion 63a of a frame memory 63.

When a picture of a frame to be processed as a P-picture is supplied from the scan converter 71, the sums of absolute values of the macro-block-based inter-frame differences (prediction errors) are supplied from the motion vector detection circuit 50 to the prediction mode switching circuit 52 and to the prediction decision circuit 54, in the same manner as described above. The frame/field prediction mode, intra-picture prediction mode or the forward prediction mode is set in association with the sums of the macro-block-based prediction errors.

When the intra-frame prediction mode is set, the calculating unit 53 sets the movable contact of the switch 53d to its fixed contact a, as described above. Thus, similar to the I-picture data, the corresponding data is supplied via the DCT mode switching circuit 55, DCT circuit 56, quantization circuit 57, variable length coding circuit 58 and the transmission buffer 59 to the transmission path. The same data is also supplied via the dequantization circuit 60, IDCT circuit 61 and the calculating unit 62 to a backward predicted picture portion 63b of the frame memory 63 for storage therein.

At the same time as the switch 53d is set to the side of the fixed contact b for the forward prediction mode, data of a picture stored in the forward predicted picture portion 63a of the frame memory 63, herein the picture of the I-picture, are read out and motion-compensated by the motion compensation circuit 64 in association with the motion vector outputted by the motion vector detection circuit 50.

Output predicted picture data from the motion prediction circuit 64 is fed to a calculating unit 53a, which subtracts, from the data of the macro-block of the reference picture supplied from the prediction mode switching circuit 52, the predicted picture data for the macro-block, supplied from the motion compensation circuit 64, and outputs the difference, that is predicted errors. The difference data is transmitted on the transmission path via the DCT mode switching circuit 55, DCT circuit 56, quantization circuit 57, variable length coding circuit 58 and the transmission buffer 59. The difference data is also locally decoded by the dequantization circuit 60 and the IDCT circuit 61 so as to be supplied to the calculating unit 62.

However, if the *3:2* pull-down source input flag S115 has been set, both the prediction flag and the DCT flag are fixed values of the frame mode, so that these flags are not outputted by the variable length coding circuit 58. Instead, the variable length coding circuit transmits the information that the flag S115 has been set, that is that the input frame is of the progressive structure.

The calculating unit 62 is also fed with the same data as the predicted picture data supplied to the calculating unit 53a. The calculating unit 62 adds the predicted output picture data of the motion compensation circuit 64 to the output difference data from the IDCT circuit 61. The picture data of the P-picture are fed to and stored in the backward predicted picture portion 63b of the frame memory 63.

When fed from the scan converter 71 with the picture of a frame to be processed as a B-picture, the motion vector detection circuit 50 transmits the sums of the absolute values of the macro-block-based inter-frame differences (prediction errors) to the prediction mode switching circuit 52 and to the prediction decision circuit 54. The prediction mode switching circuit 52 and to the prediction decision circuit 54 then set the frame/field mode in dependence upon the magnitudes of the sums of the absolute values of the macro-block-based inter-frame differences, while setting the prediction mode to one of the intra-picture coding, forward predictive coding, backward predictive coding and bidirectional predictive coding.

The switch 53d is set to the side of the fixed contacts a or b for the intra-frame prediction mode or the forward prediction mode, respectively, as described above. At this time, the processing similar to that for the P-picture is performed for data transmission.

Conversely, when the prediction mode is the backward prediction mode or the bidirectional prediction mode or, the switch 53d is set to the sides of the fixed contacts c or d, respectively.

For the backward prediction mode when the switch 53d is set to the contact c, the data of the picture stored in the backward predicted picture portion 63b, herein the picture of the P-picture, is read out so as to be motion-compensated in association with the motion vector outputted by the motion vector detection circuit 50.

The predicted picture data outputted by the motion compensation circuit 64 is supplied to the calculating unit 53b. The calculating unit 53b subtracts the predicted picture data supplied from the motion compensation circuit 64 from the input macro-block data supplied from the prediction mode switching circuit 52 and output the resulting difference data. The resulting difference data is transmitted on the transmission path via the DCT mode switching circuit 55, DCT circuit 56, quantization circuit 57, variable length encoding circuit 58 and the transmission buffer 59. The difference data is also locally decoded by the dequantization circuit 60 and the IDCT circuit 61 so as to be supplied to the calculating unit 62.

The calculating unit 62 is also fed with the same data as the predicted picture supplied to the calculating unit 53*b*. The calculating unit 62 adds the predicted output picture data of the motion compensation circuit 64 to the output difference data of the IDCT circuit 61. This gives picture data of the locally decoded B-picture.

For the bidirectional prediction mode, when the switch 53*d* is set to the side of the contact d, data of the picture stored in the forward predicted picture portion 63*a*, herein the picture of the I-picture, and data of the picture stored in the backward predicted picture portion 63*b*, herein the picture of the P-picture, are read out and motion-compensated by the motion compensation circuit 64 in association with the motion vector outputted by the motion vector detection circuit 50.

The predicted picture data, outputted by the motion compensation circuit 64, is fed to a calculating unit 53*c*. The calculating unit 53*c* subtracts, from data of an input macro-block supplied from the prediction mode switching circuit 52, a mean value of the predicted picture data supplied form the motion compensation circuit 64, and outputs difference data. This difference data is transmitted on the transmission path via the DCT mode switching circuit 55, DCT circuit 56, quantization circuit 57, variable length encoding circuit 58 and the transmission buffer 59. The difference data is also locally decoded by the dequantization circuit 60 and the IDCT circuit 61 so as to be supplied to the calculating unit 62.

The calculating unit 62 is also fed with the same data as the predicted picture supplied to the calculating unit 53*c*. The calculating unit 62 adds the predicted output picture data of the motion compensation circuit 64 to the output difference data of the IDCT circuit 61. This gives picture data of the locally decoded B-picture.

If the 3:2 pull-down source input flag S115 has been set, both the prediction flag and the DCT flag are fixed values of the frame mode, so that these flags are not outputted by the variable length coding circuit 58. Instead, the variable length coding circuit transmits the information that the flag S115 has been set, that is that the input frame is of the progressive structure.

Since the B-picture is not used as the prediction picture for other pictures, it is not stored in the frame memory 63.

In the frame memory, bank switching is occasionally performed between the forward prediction picture and the backward prediction picture so that the forward prediction picture or the backward prediction picture will be selected and outputted for a given reference picture.

The foregoing description has been made on luminance blocks. However, the chroma blocks are also similarly processed and transmitted on the macro-block bases as shown in FIGS. 16A, 16B, 17A and 17B. The motion vector employed for processing the chroma block corresponds to the motion vector of the associated luminance block halved in both the vertical and horizontal directions.

If invalid frames are fed from the scan converter 71, the DCT circuit 56, dequantization circuit 60, inverse DCT circuit 61 or the motion compensation circuit 64 performs no processing such that nonsensical data is outputted by the calculating unit 62. No data is written at this time in the frame memory 63. During this time, no bitstream is outputted by the variable length encoding circuit 58.

If the encoded data of the I-, P- and B-picture or the invalid frame is routed as described above, the picture data locally decoded by the calculating unit 62 is entered to the scan converter 72 which converts the macro-block-based input data into raster scanning data S505. The raster scanning data S505 enters a picture display sequence rearranging unit 73. FIG. 18 shows illustrative examples of the output of the picture display sequence rearranging unit 73. For rearranging the display sequence of the input picture in accordance with the following rules (i) to (iii) based upon the picture encoding types.

(i) The I-picture, initially entered, is stored in the picture display sequence rearranging unit 73.

(ii) If the picture entered next is the B-picture or the invalid frame, the picture is directly outputted. If the picture entered next is the I- or P-picture, the I- or P-picture stored in the picture display sequence rearranging unit 73 is outputted. The currently entered I- or P-picture is newly stored in the picture display sequence rearranging unit 73.

(iii) The processing reverts to (ii).

The locally decoded picture S109 is outputted from the picture display sequence rearranging unit 73 as shown in (i) to (iii) above.

The locally decoded picture S109 is outputted via a post-processor 206 to a monitor 207 as a picture outputting unit as explained with reference to FIG. 4.

What is claimed is:

1. A method of restoring a processed signal representing a moving picture which is divided into a plurality of frames such that each respective frame is formed of one odd field and one even field, the processed signal obtained by detecting a redundant field from an input signal, by combining the odd and even fields to form the respective frames such that the redundant field is eliminated from the input signal, by inserting a predetermined invalid frame into the input signal to obtain an output signal for processing at a substantially the same clock rate as a predetermined clock rate of the input signal, and by adding supplemental data to the output signal, said method comprising the steps of:

separating from the processed signal the supplemental data which indicates which of the respective odd and even fields were combined to form the respective frames and further indicates where the predetermined invalid frame was inserted;

removing the predetermined invalid frame from the processed signal based on the supplemental data; and repeating a respective field in the processed signal at a portion from which the predetermined invalid frame was removed for generating the redundant field, whereby the processed signal is substantially the same as the input signal.

2. The method according to claim 1, wherein the input signal is generated according to a 3:2 pull-down process where each respective redundant field is repeated after two respective frames for converting a motion picture film to a moving pictures video.

3. An apparatus for restoring a processed signal representing a moving picture which is divided into a plurality of frames such that each respective frame is formed of one odd field and one even field, the processed signal obtained by detecting a redundant field from an input signal, by combining the odd and even fields to form the respective frames such that the redundant field is eliminated from the input signal, by inserting a predetermined invalid frame into the input signal to obtain an output signal for processing at a substantially the same clock rate as a predetermined clock rate of the input signal, and by adding supplemental data to the output signal, said apparatus comprising:

means for separating from the processed signal the supplemental data which indicates which of the respective odd and even fields had been combined to form the respective frames and further indicates where the predetermined invalid frame has been inserted;

means for removing the predetermined invalid frame from the processed signal based on the supplemental data; and means for repeating a respective field in the processed signal at a portion from which the predetermined invalid frame had been removed for generating the redundant field, whereby the processed signal is substantially the same as the input signal.

4. The apparatus according to claim 3, wherein the input signal is generated according to a 3:2 pull-down process where each respective redundant field is repeated after two respective frames for converting a motion picture film to a moving pictures video.

* * * * *